(12) United States Patent
Fozunbal et al.

(10) Patent No.: US 8,483,398 B2
(45) Date of Patent: Jul. 9, 2013

(54) METHODS AND SYSTEMS FOR REDUCING ACOUSTIC ECHOES IN MULTICHANNEL COMMUNICATION SYSTEMS BY REDUCING THE DIMENSIONALITY OF THE SPACE OF IMPULSE RESPONSES

(75) Inventors: Majid Fozunbal, Mountain View, CA (US); Ronald W. Schafer, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

(21) Appl. No.: 12/387,351

(22) Filed: Apr. 30, 2009

(65) Prior Publication Data
US 2010/0278351 A1 Nov. 4, 2010

(51) Int. Cl.
*H04B 3/20* (2006.01)
*H04B 15/00* (2006.01)
*H04M 9/08* (2006.01)

(52) U.S. Cl.
USPC .......................... 381/66; 381/96; 379/406.01

(58) Field of Classification Search
USPC ........... 381/66; 379/406.01–406.16; 370/286, 370/289
See application file for complete search history.

(56) References Cited

U.S. PATENT DOCUMENTS

| | | | | |
|---|---|---|---|---|
| 6,895,093 B1 * | 5/2005 | Ali | ................................. | 381/66 |
| 2002/0159603 A1 * | 10/2002 | Hirai et al. | ...................... | 381/61 |
| 2007/0253565 A1 * | 11/2007 | Fozunbal | ........................ | 381/66 |

OTHER PUBLICATIONS

Tsai et al (Dimensionality reduction techniques for data exploration. This paper appears in: Information, Communications & Signal Processing, International Conference on Dec. 10-13, 2007).*

* cited by examiner

*Primary Examiner* — Matthew Landau
*Assistant Examiner* — Khaja Ahmad

(57) ABSTRACT

Various embodiments of the present invention are directed to adaptive methods for reducing acoustic echoes in multichannel audio communication systems. Acoustic echo cancellation methods determine approximate impulse responses characterizing each echo path between loudspeakers and microphones within a room and improve performance based on previously determined impulse responses. In particular, the methods adapt to changes in the room by inferring approximate impulse responses that lie within a model of an impulse response space. Over time the method improves performance by evolving the model into a more accurate space from which to select subsequent approximate impulse responses.

20 Claims, 18 Drawing Sheets

METHODS AND SYSTEMS FOR REDUCING ACOUSTIC ECHOES IN MULTICHANNEL COMMUNICATION SYSTEMS BY REDUCING THE DIMENSIONALITY OF THE SPACE OF IMPULSE RESPONSES

TECHNICAL FIELD

The present invention is related to acoustic echo cancellation, and, in particular, to methods and systems for reducing acoustic echoes in communication systems.

BACKGROUND

Increasing interest in communication media, such as the Internet, electronic presentations, voice mail, and audio-conference communication systems, is increasing the demand for high-fidelity audio and communication technologies. Currently, individuals and businesses are using these communication media to increase efficiency and productivity, while decreasing cost and complexity. For example, audio-conference communication systems allow one or more individuals at a first location to simultaneously converse with one or more individuals at other locations through full-duplex communication lines in real time, without wearing headsets or using handheld communication devices. Typically, audio-conference communication systems include a number of microphones and loudspeakers, at each location, that can be used by multiple individuals for sending and receiving audio signals to and from other locations.

In many audio-conference communication systems, audio signals carry a large amount of data, and employ a broad range of frequencies. Modern audio-conference communication systems attempt to provide clear transmission of audio signals, free from perceivable distortion, background noise, and other undesired audio artifacts. One common type of undesired audio artifact is an acoustic echo. Acoustic echoes can occur when a transmitted audio signal loops through an audio-conference communication system due to the coupling of microphones and speakers at a location.

FIG. 1 shows a schematic diagram of an exemplary, two-location, single channel communication system 100. The communication system 100 includes a near room 102 and a far room 104. Sounds, such as voices, produced in the near room 102 are detected by a microphone 106, and sounds produced in the far room 104 are detected by a microphone 108. The microphones 106 and 108 are transducers that convert the sounds into continuous analog signals that are represented by x(t) and y(t), respectively, where t is time. The microphone 106 can detect many different sounds produced in the near room 102, including sounds output by the loudspeaker 114. An analog return signal produced by the microphone 106 is represented by:

$$y(t) = s(t) + e(x(t)) + v(t)$$

where
s(t) is an analog signal representing sounds produced in the near room 102,
v(t) is an analog signal representing noise, or extraneous signals created by disturbances in the microphone or communication channel 110, that, for example, may produces an annoying buzzing sound output from the loudspeaker 116, and
e(x(t)) is an analog signal that represents an acoustic echo. The acoustic echo e(x(t)) is due to both acoustic propagation delay in the near room 102 and a round-trip transmission delay of the analog sent signal x(t) over the communication channels 110 and 112. Sounds represented by the analog signal y(t) are output from loudspeaker 116 in the far room 104. Depending on the amplification, or gain, in the amplitude of the signal y(t) and the magnitude of the acoustic echo e(x(t)), a person speaking into the microphone 108 in the far room 104 may also hear an annoying, high-pitched, howling sound emanating from loudspeaker 116 as a result of the sound generated by the acoustic echo e(x(t)).

In recent years there has been an increasing interest in developing multichannel audio communication systems in an effort to enhance the audio-conference experience. Multichannel systems employ a plurality of microphones and loudspeakers in the near and far rooms creating a plurality of acoustic echoes, which can be a significant obstacle to effectively deploying multichannel audio-conference communication systems. These methods send signals to microphones in order to obtain impulse response estimates for the room. These impulse responses are convolved with the sent signals to produce approximate acoustic echoes that are subtracted from the return signals. A significant challenge in these multichannel systems is temporal correlation of the excitation signals sent to the loudspeakers to approximate the echo paths. The challenge often manifests itself as an ill-conditioned search for echo path approximations. This problem is called the "non-uniqueness problem" resulting in unstable control algorithms.

A variety of algorithms have been developed to address the non-uniqueness problem. For example, designers and manufacturers have developed methods that employ nonlinear or time-variant functions to uncorrelate excitation signals prior to exciting the loudspeakers. However, these methods often lead to distortions of temporal attributes of the audio signals that ultimately diminish the spatial audio experience. Other methods attempt to approximate the space of echo paths by a finite number of set-theoretic constraints. In general, these methods do not distort the excitations signals, but they do not resolve the non-uniqueness problem, and as a result, these methods are slower to converge and have higher levels of residual echoes.

Although in recent years there have been a number of advances in multichannel communications, designers, manufacturers, and users of multichannel, audio-conference communication systems continue to seek enhancements that reliably remove acoustic echoes from audio signals in real-time and rapidly adapt to the changing conditions at audio-signal-receiving locations.

DETAILED DESCRIPTION

Figure 1:
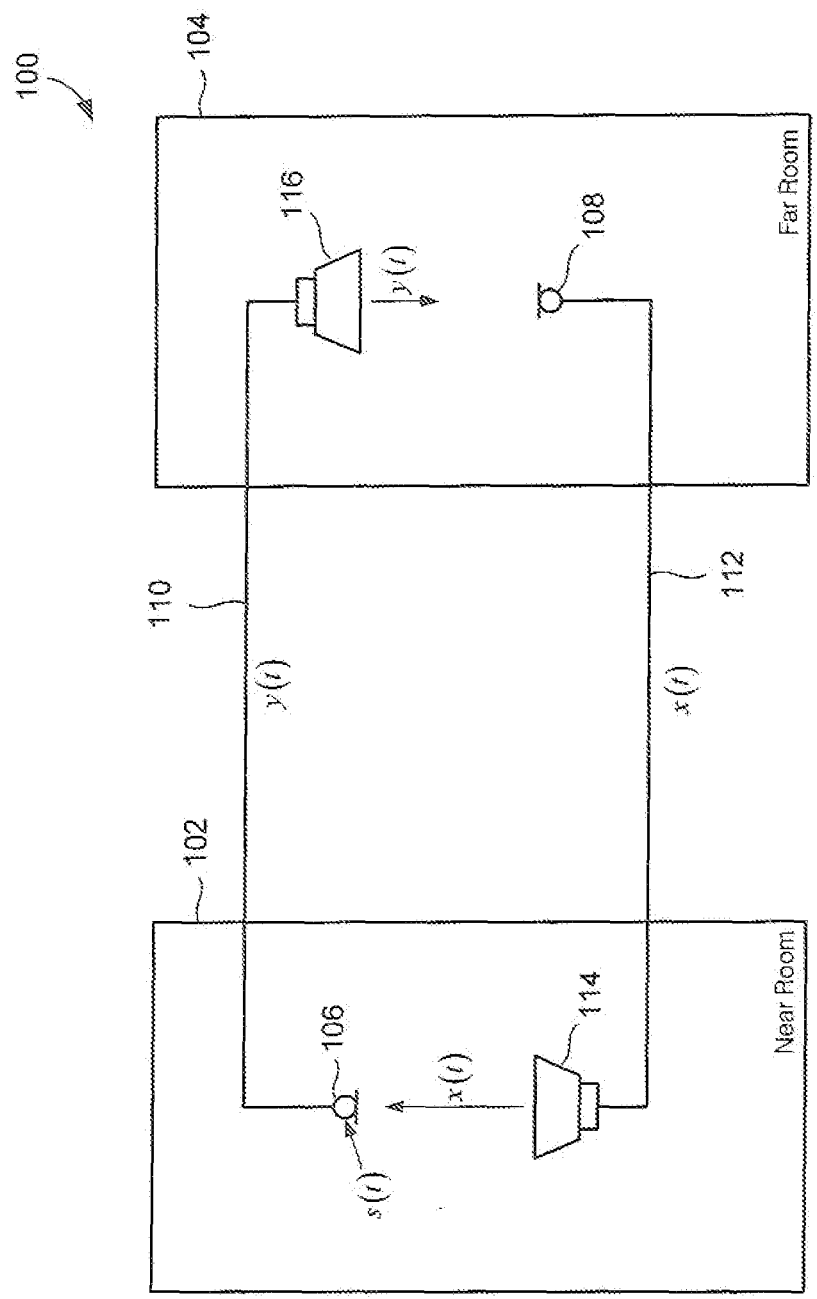
FIG. 1 shows a schematic diagram of an exemplary, two-location, audio-conference communication system.

Various embodiments of the present invention are directed to adaptive methods for reducing acoustic echoes in multichannel audio communication systems. Acoustic echo cancellation methods determine approximate impulse responses characterizing each echo path between loudspeakers and microphones within a room and, over time, improve performance based on previously determined impulse responses. In particular, the methods adapt to changes in the room, such as closing a door or moving a chair, by inferring approximate impulse responses that lie within a model region of the approximate impulse response space. Over time the performance of the method improves which corresponds to reducing the dimensionality of the model. For example, the model can be a hyper-dimensional ellipsoid that lies within the approximate impulse response space. Over time the eccentricity of the ellipsoid increases and the size and dimensionality of the ellipsoid decreases. The direction of skewness of the ellipsoid forms a basis for a low dimensional linear manifold that contains the principle components of the approximate impulse responses. By assigning higher priority to the principle directions and relatively lower priority to other directions as the ellipsoid evolves in time, the method overcomes the non-uniqueness problem during adaptation. Methods of the present invention preserve the audio quality without uncorrelating the excitation signals, once approximate impulse responses associated with echo paths of the room are learned. Method embodiments of the present invention can also be implemented in a real-time software platform.

Embodiments of the present invention are mathematical in nature and, for this reason, are described below with reference to numerous equations and graphical illustrations. Although mathematical expressions alone may be sufficient to fully describe and characterize embodiments of the present invention to those skilled in the art of acoustic echo cancellation, the more graphical problem oriented examples, and control-flow-diagram approaches included in the following discussion are intended to illustrate just one of many embodiments for implementing the present invention so that the present invention may be accessible to readers with various backgrounds. In order to assist in understanding descriptions of various embodiments of the present invention, an overview of digital signals, impulse responses, and convolution is provided in a first section. Embodiments of the present invention and an example implementation are provided in a second section.

I. An Overview of Digital Signals, Impulse Responses, and Convolution

This subsection is intended to provide a general description of digital signals, impulse responses, and convolution in a monochannel audio transmission system. The concepts introduced in this subsection are then used to describe each of the audio channels in a multichannel acoustic echo embodiments described below in the next subsection. The term "microphone" refers to a transducer or any suitable device that converts sounds into electrical signals. The term "loudspeaker" refers to any suitable device capable of converting a signal into sound.

Sounds received by a microphone are transformed into an analog signal comprising a time-dependent, continuously varying voltage. In order to process an analog signal using a digital computer, the analog signal is first converted into a digital signal with minimal alteration of the essential information contained in the analog signal. Digital signals can be stored electronically, magnetically, or optically and can be processed using logical and arithmetic operations encoded in computer programs.

For efficient and convenient digital signal processing, it is desirable for both time and amplitude values of a digital signal to be integer valued. Techniques for converting a digital signal into a digital signal with integer time and amplitude values are well-known in the art. An integer-valued sampling time is called a "time sample," and an integer-valued amplitude is called a "digital amplitude." The resulting digital signal can be functionally represented by x[n], where n, an independent variable, represents a time sample.

The impulse response of a room can be determined by applying an impulse of sound with a very short duration to the loudspeaker and measuring the signal recorded by the microphone. The sampled impulse response of the room can be represented by a vector as follows:

$$h[n] = \bar{h}_n = \begin{bmatrix} h_n[0] \\ h_n[1] \\ \vdots \\ h_n[L-1] \end{bmatrix}$$

where $h_n[\cdot]$ is an impulse response component, and
L is the number of components comprising the impulse response length.

The loudspeaker, room, and microphone are referred to as a "system," and an associated impulse response can be referred to as a "system impulse response." The microphone collects sounds produced in the room and generates a corresponding analog signal that is converted into a digital signal x[n] convolved with the impulse response h[n]. The convolved digital signal is represented by $x_c[n]$.

In general, convolving an N component input digital signal x[n] with an L component impulse response h[n] gives an N+L−1 component convolved digital signal $x_c[n]$. A component of a convolved digital signal $x_c[n]$ is mathematically determined by:

$$\begin{aligned} x_c[n] &= x[n] * h[n] \\ &= \vec{h}_n \cdot \vec{x}[n] \\ &= \sum_{i=0}^{L-1} h_n[i] x[n-i] \end{aligned}$$

where

"*" is a symbol representing convolution, and $$\vec{x}[n] = \begin{bmatrix} x[n] \\ x[n-1] \\ \vdots \\ x[n-(L-1)] \end{bmatrix}$$

In order to compute a convolved signal component $x_c[n]$, the L previously obtain digital signal components of the digital signal x[n] are used, and the components of the vector $\vec{x}[n]$ that correspond to negative valued time samples are assigned the value "0."

In the examples of convolution described above, the impulse response is assumed to remain constant at each time sample in the time domain. However, in practice, the impulse response of a system often depends on the conditions of the room. In other words, the impulse response of the system may change over time as conditions in the room change.

II. Embodiments of the Present Invention

A. The Space of Impulse Responses

Figure 2A:
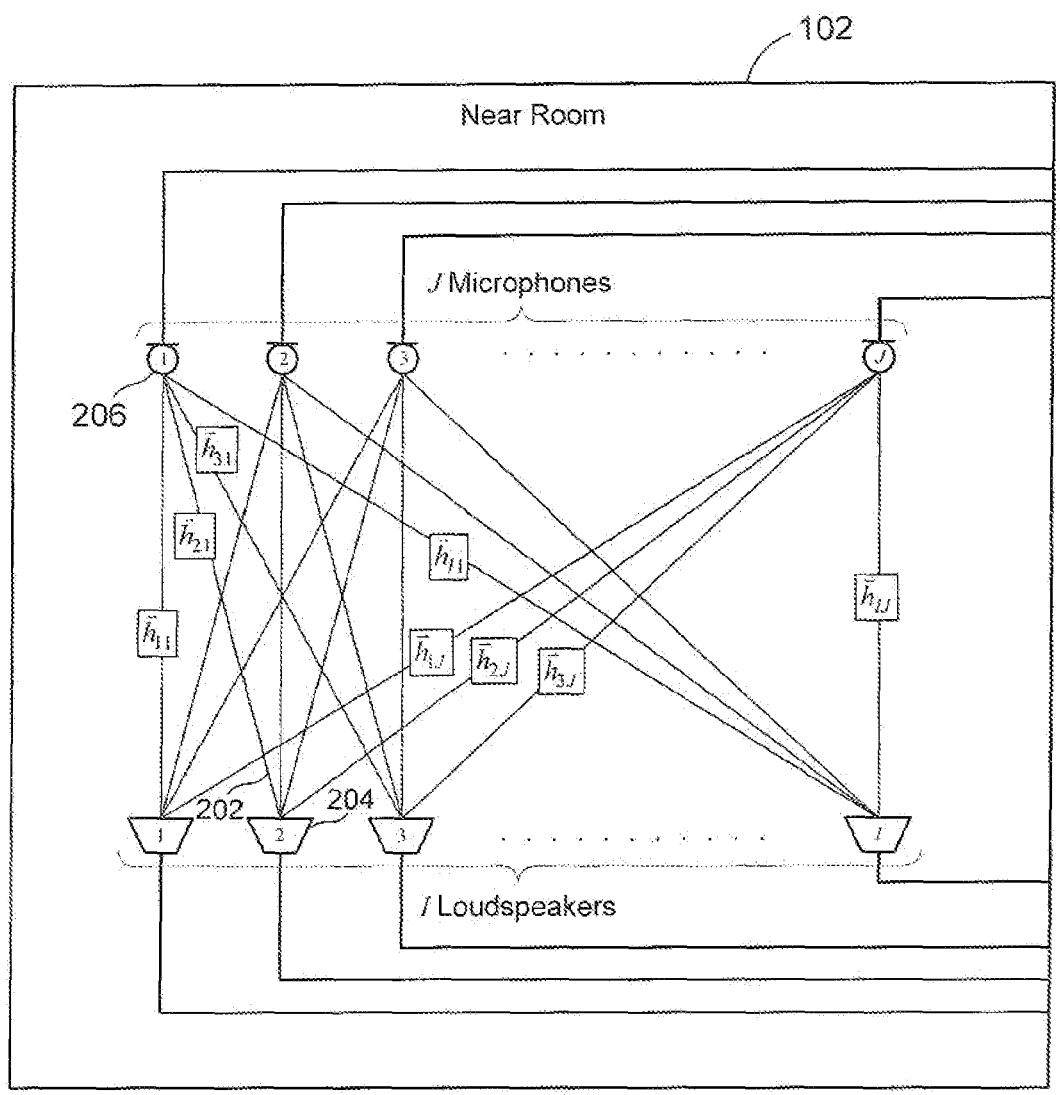
FIG. 2A shows echo paths associated with coupling loudspeakers and microphones in a room in accordance with embodiments of the present invention.

FIG. 2A shows the room 102 comprising I loudspeakers and J microphones in accordance with embodiments of the present invention. Acoustic coupling, called an "echo path," exists between each loudspeaker and each microphone. Each echo path is characterized by an associated time varying, real-valued impulse-response vector $\vec{h}_{ij}$, where $i \in \{1, \ldots, I\}$ is a loudspeaker index, and $j \in \{1, \ldots, J\}$ is a microphone index. Suppose h represents a concatenation of the impulse responses for the near room 102, which is represented by:

$$h^T = \{\vec{h}_{11}, \vec{h}_{12}, \ldots, \vec{h}_{1J}, \vec{h}_{21}, \vec{h}_{22}, \ldots, \vec{h}_{2J}, \ldots, \vec{h}_{I1}, \vec{h}_{I2}, \ldots, \vec{h}_{IJ}\} = \{\vec{h}_{ij}\}_{IJ}$$

As shown in FIG. 2A, sixteen of the echo paths coupling loudspeakers and microphones in the room 102 are represented by lines, and eight of these sixteen echo paths are labeled with a corresponding impulse-response vector $\vec{h}_{ij}$. For example, the impulse-response vector associated with echo path 202 between the $2^{nd}$ loudspeaker 204 and the $1^{st}$ microphone 206 is $\vec{h}_{21}$. The echo paths, and the associated impulse responses, change as the configuration of the room 102 changes, such as moving furniture or opening and closing doors.

Suppose $\mathcal{M}$ is a model for the space of possible impulse responses for the room 102, such that $h \in \mathcal{M}$. Intuitively, a model $\mathcal{M}$ can be any regularity that is common among the echo paths. For example, the impulse responses comprising h can decay after about 40 ms, which implies that the impulse responses of h have similar timings between first direct arrivals and the first reflections and implies that a constant relative change in some parameters have more impact on the resultant echo.

Determining the model $\mathcal{M}$ is a non-uniqueness problem with a large number of unknown parameters. An approach for addressing this problem is manifold modeling (see *Principal Manifolds for Data Visualization and Dimension Reduction*, A. Gorban et al., Berlin, Springer, 2007). A manifold is a space in which every point has an open neighborhood resembling a Euclidean space with dimensions no larger than the dimension of the space where its global structure lies. Examples include the surface of a sphere. The manifold is the model $\mathcal{M}$ that lies within the space of possible impulse responses. Method embodiments are based on principle component analysis, which enables the model $\mathcal{M}$ to be dynamically learned over time. The idea is based on the principle that a main portion of the energy associated with the impulse responses lies with a relatively small number of impulse responses. Methods of the present invention employ principle component analysis to narrow the model $\mathcal{M}$ over time to impulse responses corresponding to the main portion of the impulse response energy.

In practice, the multichannel impulse response h is approximated by:

$$\hat{h}^T = \{\hat{\vec{h}}_{11}, \hat{\vec{h}}_{12}, \ldots, \hat{\vec{h}}_{1J}, \hat{\vec{h}}_{21}, \hat{\vec{h}}_{22}, \ldots, \hat{\vec{h}}_{2J}, \ldots, \\ \hat{\vec{h}}_{I1}, \hat{\vec{h}}_{I2}, \ldots, \hat{\vec{h}}_{IJ}\} = \{\hat{\vec{h}}_{ij}\}_{IJ}$$

Embodiments deal with the non-uniqueness problem by learning the model $\mathcal{M}$ of the near room 102. In certain instances, the model can be a hyper-dimensional ellipsoid whose shape and orientation in the space of impulse response changes with changing conditions in the near room.

Figure 2B:
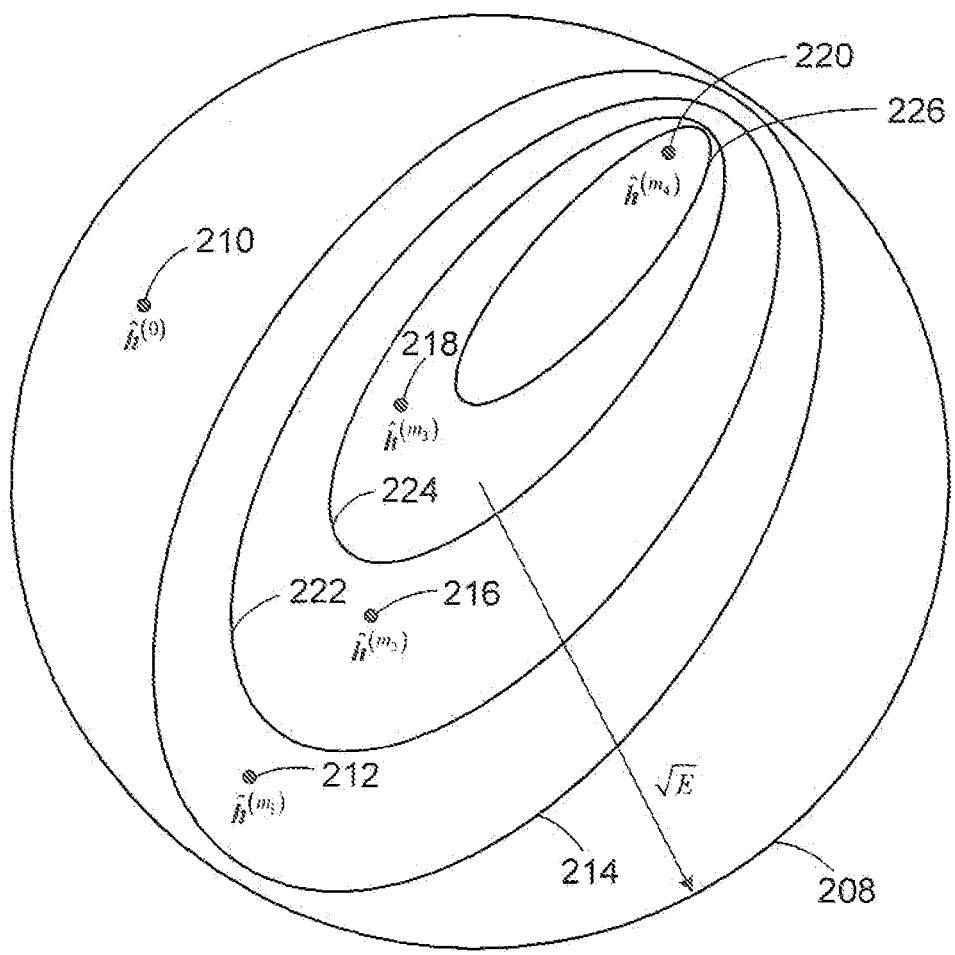
FIG. 2B shows a two-dimensional representation of an impulse response hyper-dimensional space in accordance with embodiments of the present invention.

FIG. 2B shows a two-dimensional representation of an impulse response hyper-dimensional space in accordance with embodiments of the present invention. FIG. 2B represents how methods of the present invention learn the model $\mathcal{M}$ of the near room 102 over time by dynamically refining the space of impulse responses to a relatively small hyper-dimensional ellipsoid comprising the model of impulse responses. When the method of the present invention is initiated, the method is unaware of the room environment and the model $\mathcal{M}$ can be characterized as a hyper-dimensional ball represented in FIG. 2B by a circle 208. The radius of the ball is $\sqrt{E}$, where E represents the maximum amplification energy, or gain, produced by a microphone in response to an impulse. As shown in FIG. 2B, an initial impulse response $\hat{h}^{(0)}$ 210 lies within the ball 208. As time passes, the method iteratively learns the model $\mathcal{M}$ comprising the approximate impulse response $\hat{h}$ associated with the main portion of the energy of the impulse responses, based on previously obtained approximate impulse responses. The previously obtained impulse responses can be impulse responses determined within the same multichannel conference or impulse responses obtained in a previous multichannel conference. The model $\mathcal{M}$ of the room 102 gradually transforms from a hyper-dimensional ball into a hyper-dimensional ellipsoid. FIG. 2B includes a subsequent impulse response $\hat{h}^{(m_1)}$ 612 that lies within a hyper-dimensional ellipsoid 214, where $m_1$ represents a first decision epoch described below with reference to FIG. 9. FIG. 2B also reveals subsequent impulse responses $\hat{h}^{(m_2)}$ 216, $\hat{h}^{(m_3)}$ 218, and $\hat{h}^{(m_4)}$ 220 that lie within smaller hyper-dimensional ellipsoids 222, 224, and 226, each ellipsoid representing a model of the room at a later time. Note that over time and through continued application of methods of the present invention, the eccentricity of the hyper-dimensional ellipsoids increases, orientation of the ellipsoids change, and the space occupied by the ellipsoids decrease. In other words, methods of the present invention dynamically learn the model $\mathcal{M}$ of the room 102, and the number of suitable approximate impulse responses $\hat{h}$ used in multichannel communication may actually decreases over time. For example, although the impulse response $\hat{h}^{(m_1)}$ 212 may be suitable during the duration of the first decision epoch, the method determines the impulse response $\hat{h}^{(m_1)}$ 212 is not suitable for use at later times. This can be the result of changes in the room, such as rearranging furniture, closing a door, movement of people, and the impulse response $\hat{h}^{(m_1)}$ 212 is said to be "qualified." On the other hand, when the room does not undergo a change, an impulse response is said to be "not qualified."

Qualified approximate impulse responses satisfy two criteria: 1) they correspond to a new echo path, and 2) are estimates of the echo paths with relatively high accuracy and confidence. The second criterion is satisfied by uncorrelating the excitation signals. Using the qualified approximate impulse responses, the method dynamically improves the inferred model until it matures. Once the model matures as indicated by the number of qualified approximate impulse responses used in inference, the method saves the qualified approximate impulse responses for future use. After this period, the method rules out any uncorrelated process and relies on the model of qualified approximate impulse responses to track changes in the room.

Figure 3A:
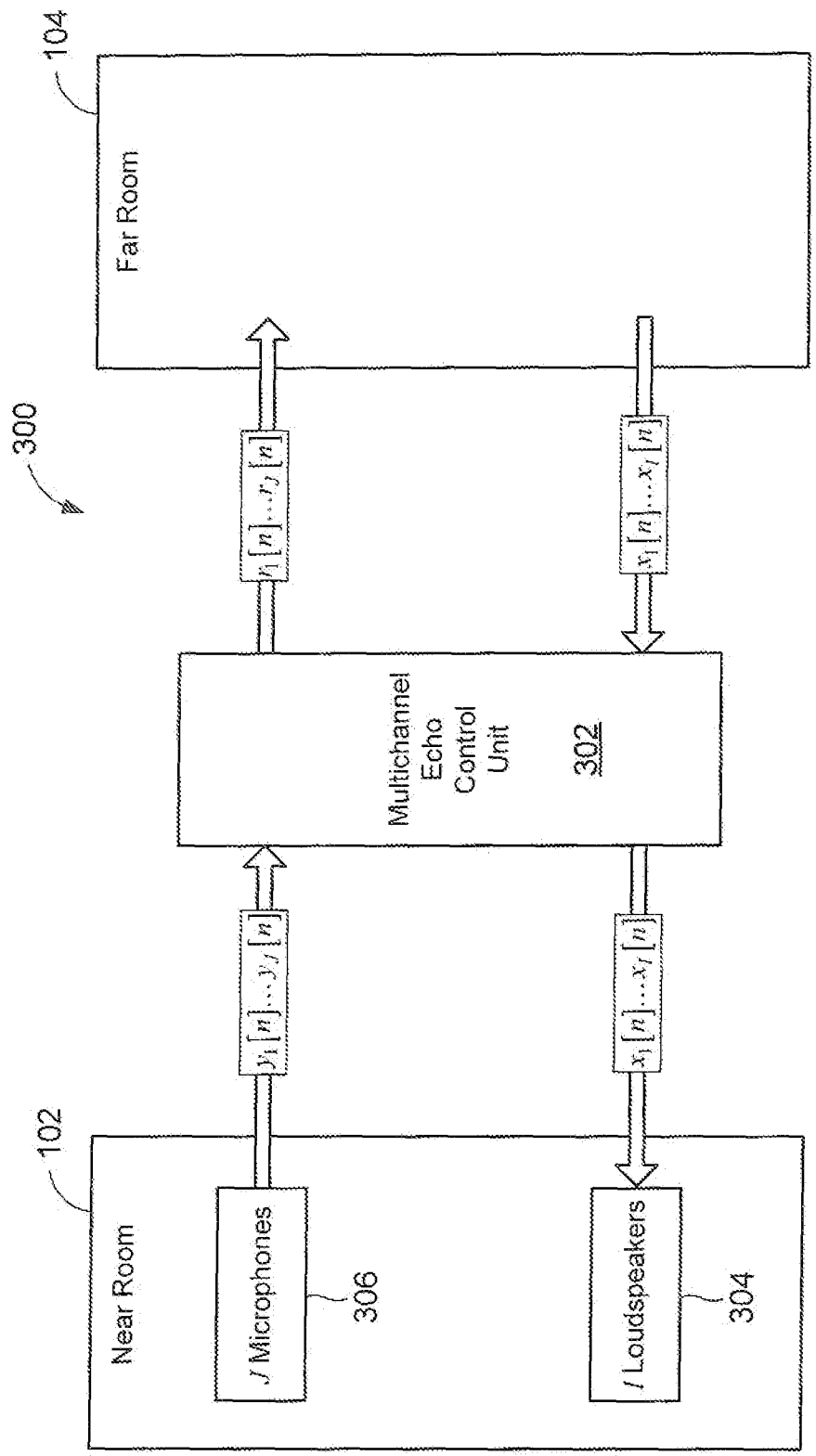
FIG. 3A shows a block diagram of a mixed multichannel audio-communication system that represents an embodiment of the present invention.

B. Overview of Acoustic Echo Cancellation in Mixed Multichannel Audio-Communication Systems FIG. 3A shows a block diagram of a mixed multichannel audio-communication system 300 that represents an embodiment of the present invention. The mixed multichannel audio-communication system 300 includes a multichannel echo control unit ("MECU") 302, and I loudspeakers 304 and J microphones 306 located in the near room 102, where I and J are natural numbers that represent the total number of loudspeakers and the total number of microphones, respectively. The loudspeakers 304 can be configured to receive digital signals sent from the MECU and convert the digital signals into analog signals that are broadcast in the near room 102. On the other hand, the microphones 306 can be configured to collect sounds produced in the near room 102 generate corresponding analog that are converted into digital signals that are sent to the MECU 302. The MECU 302 is a computing device that includes one or more processors, such as a central processing unit; optionally one or more display devices, such as a monitor; one or more network interfaces, such as a USB port, an Ethernet, or FireWire port; and one or more computer-readable mediums. Each of these components is operatively coupled to one or more buses. For example, the bus can be an EISA, a PCI, a USB, a FireWire, a NuBus, or a PDS. In other embodiments, the MECU 302 may not include display devices or input devices, such as keyboard or keypad.

The MECU 302 can also include a computer readable medium that can be any medium providing instructions to the processor for execution and storing approximate impulse response as described below. For example, the computer readable medium can be non-volatile media, such as an optical or a magnetic disk; volatile media, such as memory; and transmission media, such as coaxial cables, copper wire, and fiber optics. Transmission media can also take the form of acoustic, light, or radio frequency waves.

The computer-readable medium also includes an operating system, such as Mac OS, Windows, Unix, and Linux; a network communications module; and an application for carrying out the multichannel acoustic echo methods of the present invention. The operating system can be multi-user, multiprocessing, multitasking, multithreading, real-time and the like. The operating system can also perform basic tasks such as recognizing input from input devices, such as a keyboard or a keypad; sending output to the display; keeping track of files and directories on storage medium; controlling peripheral devices, such as disk drives and printers; and managing traffic on the one or more buses. The network applications include various components for establishing and maintaining network connections, such as software for implementing communication protocols including TCP/IP, HTTP, Ethernet, USB, and FireWire.

As shown in FIG. 3A, MECU 302 can be located outside the near room 102. In fact, in certain embodiments of the present invention, MECU 302 can be located in an adjacent room, a room in the same building. In other embodiments of the present invention, MECU 302 can be located inside near room 102. In other embodiments of the present invention, a second MECU can be included to cancel acoustic echoes in the digital signals $\{x_i[n]\}_I$ transmitted from the far room 104 to the near room 102.

Digital signals $x_1[n], \ldots, x_I[n]$ generated in the far room 104 are transmitted to MECU 302 and are played simultaneously through loudspeakers 304 located in near room 102. Microphones 306 detect sounds produced by people, audio devices, and other noise generating sources located in near room 102 and detect reverberated sounds or echoes produced by sounds originating from loudspeakers 304. Acoustic coupling between loudspeakers 304 and microphones 306 is described below with reference to FIG. 3B. The sounds detected by microphones 306 are transmitted in the form of J microphone-digital signals $y_1[n], \ldots, y_J[n]$ to MECU 302. MECU 302, described in greater detail below with reference to FIG. 8, processes the microphone-digital signals $y_1[n], \ldots, y_J[n]$ in order to obtain J processed digital signals $r_1[n], \ldots, r_J[n]$, which are substantially free of acoustic echoes and background noise and are transmitted to far room 104.

In the following description of the present invention, the notation, $\{\bullet\}_N$, where N is the number of elements in the set, is introduced as a compact way of representing a set of N digital signals. For example, the digital signals $x_1[n], \ldots, x_I[n]$ can instead be represented by $\{x_i[n]\}_I$.

Figure 3B:
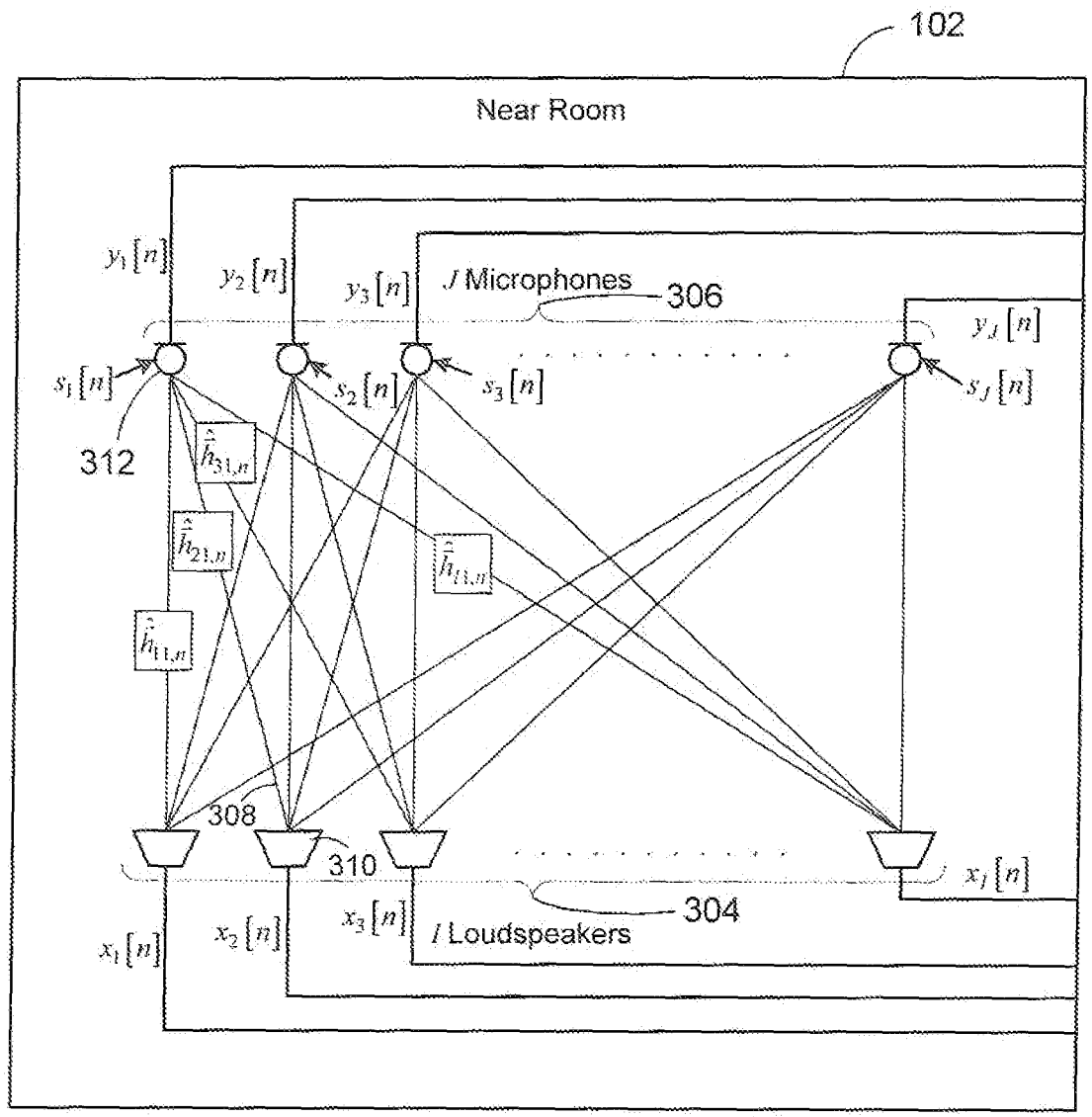
FIG. 3B shows acoustic coupling between the loudspeakers and the microphones, shown in FIG. 3A, in accordance with an embodiment of the present invention.

At any given time sample n, a time varying, real-valued impulse-response vector $\vec{h}_{ij,n}$ exits for each echo path. FIG. 3B shows acoustic coupling between loudspeakers 304 and microphones 306, shown in FIG. 3A, that represents an embodiment of the present invention. Four of the echo paths are labeled with a corresponding impulse-response vector $\vec{h}_{ij,n}$. For example, at the time sample n, the impulse-response vector associated with echo path 308 between the $2^{nd}$ loudspeaker 310 and the $1^{st}$ microphone 312 is $\vec{h}_{ij,n}$. A reverberated version or echo of a particular digital signal $x_i[n]$ played through the ith loudspeaker and detected by the jth microphone is denoted by $\vec{h}_{ij,n} * x_i[n]$. The total echo associated with the digital signals $\{x_i[n]\}_I$ detected by the jth microphone is given by:

$$e_j[n] = \sum_{i=1}^{I} \vec{h}_{ij,n} * x_i[n]$$

As shown in FIGS. 3A-3B, microphones 306 transmit J microphone-digital signals $\{y_j[n]\}_J$ to MECU 302, where each microphone-digital signal is characterized by:

$$y_j[n]=s_j[n]+e_j[n]$$

and $s_j[n]$ represents a local source signal generated by people, audio devices, and other noise generating sources located in near room 102.

Figure 4:
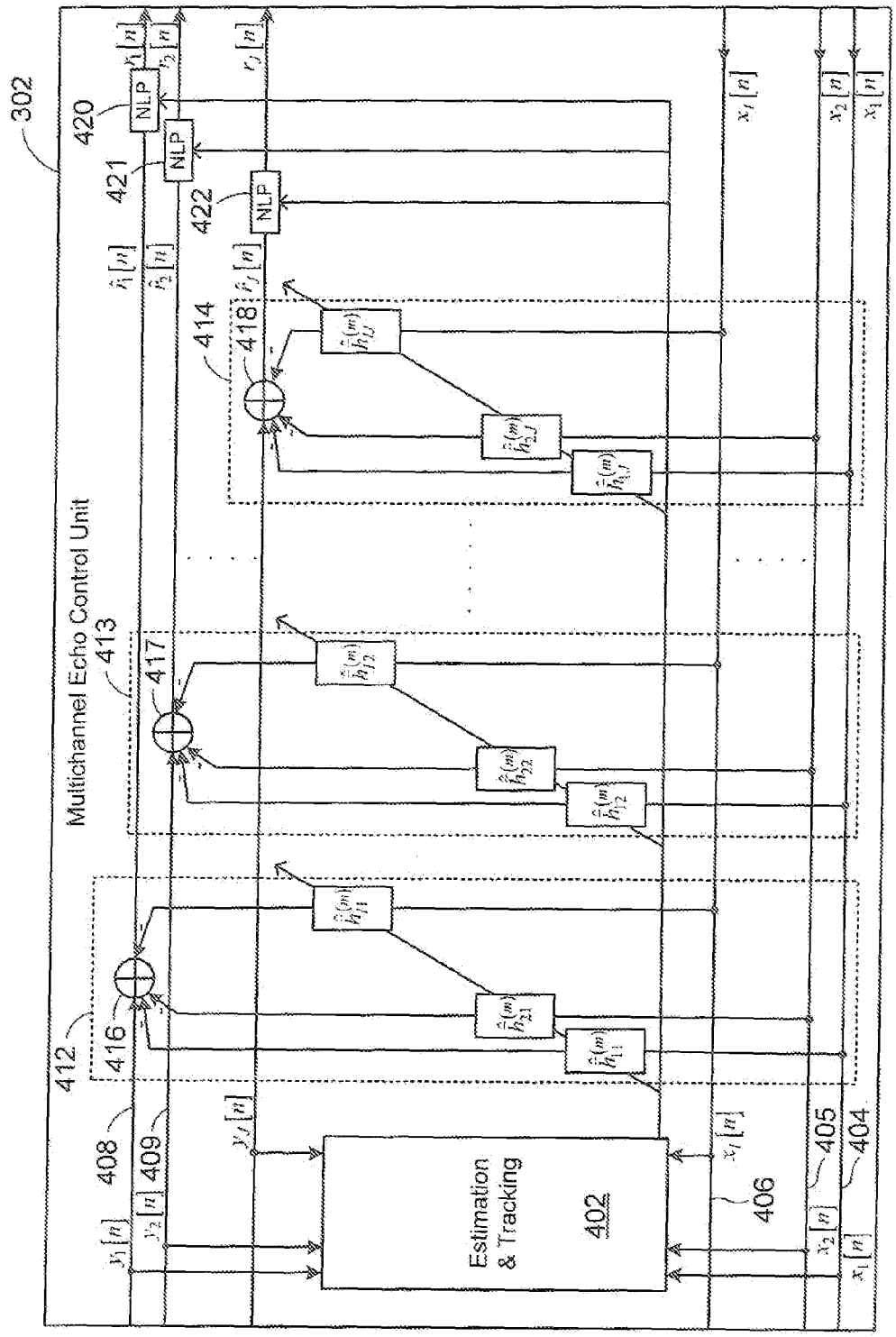
FIG. 4 shows a schematic block diagram of acoustic echo cancellation carried out by a multichannel echo control unit in accordance with an embodiment of the present invention.
Figure 5:
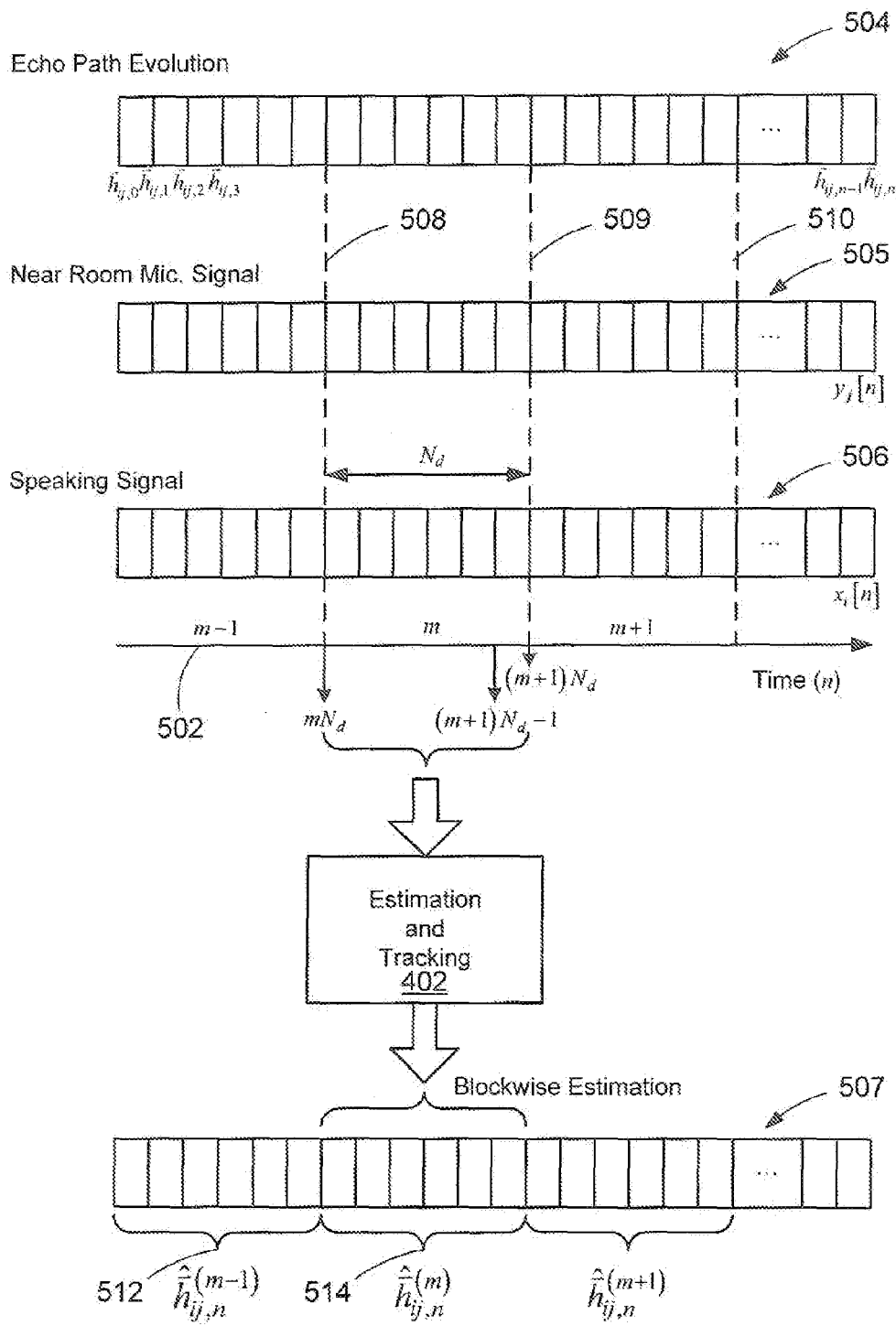
FIG. 5 shows a plot of decision periods and decision epochs associated with approximate-impulse-response vectors in accordance with an embodiment of the present invention.

For each microphone digital signal, method and system embodiments of the present invention are directed to substantially cancelling the acoustic echoes $\{e_j[n]\}_J$ from the corresponding microphone-digital signals $\{y_j[n]\}_J$ without causing substantial distortion to the local source signal $\{s_j[n]\}_J$. FIG. 4 shows a block diagram of acoustic echo cancellation carried out by MECU 302, shown in FIG. 3B, that represents an embodiment of the present invention. MECU 302 includes an estimation and tracking block 402 that receives the digital signals $\{x_i[n]\}_I$ and the microphone-digital signals $\{y_j[n]\}_J$, as indicated by directional arrows connecting input channels 404-406 and the microphone channels 410-408 to the estimation and tracking block 402. The estimation and tracking block 402 generates approximate impulse response vectors to produce $\{\hat{e}_j[n]\}_J$, which are correspondingly subtracted from the microphone-digital signals $\{y_j[n]\}_J$ at J adaptive filters, three of which are represented by dashed-line boxes 412-414. However, rather than generating approximate-impulse-response vectors $\{\vec{h}_{ij,n}\}_{IJ}$ for each time sample n, method embodiments of the present invention are based on the assumption that the impulse-response vector $\{\vec{h}_{ij,n}\}_{IJ}$ exhibits little variation over a number of time samples, $N_c$, called the "coherence time." In other words, for each impulse-response vector, the maximum deviation over $N_c$ time samples is bounded by:

$$\|\vec{h}_{ij,n}-\vec{h}_{ij,n+n_c}\| \leq 2\sqrt{E}$$

As a result, instead of determining a set of approximate-impulse-response vectors $\{\vec{h}_{ij,n}\}_{IJ}$ for each time sample n, methods of the present invention compute a set of approximate-impulse-response vectors, denoted by $\{\vec{h}_{ij}^{(m)}\}_{IJ}$, at the beginning of every $N_d$ time samples, where $N_d \ll N_c$, and m is a positive integer. An interval with $N_d$ time samples is called a "decision period," and the beginning of a decision period is called a "decision epoch."

FIG. 9 shows a plot of decision periods and decision epochs associated with approximate-impulse-response vectors that represent embodiments of the present invention. In FIG. 9, horizontal axis 902 represents a time axis and structures 904-907 represent digital signals and approximate impulse responses for an echo path. Each vertical line segment represents a digital signal or an impulse response associated with a time sample. In particular, the vertical line segments in the structure 904 represent i+1 consecutive impulse-response vectors $\vec{h}_{ij,0}, \ldots \vec{h}_{ij,n}$, the vertical line segments in the structure 905 represent n+1 microphone-digital signals $y_j[n]$, and the vertical line segment in the structure 906 represent n+1 digital signals $x_i[n]$. In FIG. 4, decision periods are comprised of 6 time samples, the beginning of each is identified by one or the dashed lines 908-910. In accordance with method embodiments of the present invention, estimation and tracking block 402, produces a new set of approximate-impulse-response vectors $$\hat{h}^{(m)}=\{\hat{\vec{h}}_{ij}^{(m)}\}_I$$

for the jth microphone at the beginning of each decision period. For example, suppose that during decision period 912, estimation and tracking block 402 produces an approximate-impulse-response vector $\vec{h}_{ij}^{(m-1)}$ which is used to determine a reverberated digital signal $\vec{h}_{ij}^{(m-1)}*x_i[n]$ for the decision period 912. At the beginning 908 of the next decision period 914, estimation and tracking block 402 produces a new approximate-impulse-response vector $\vec{h}_{ij}^{(m)}$ which is then used to determine a reverberated digital signal $\vec{h}^{*}*x_i[n]$ for the next $N_d$ time samples of decision period 914. In general, at the beginning of a decision period $mN_d$, a set of approximate-impulse-response vectors $\{\vec{h}_{ij}^{(m)}\}_{IJ}$ is computed and as the approximate-impulse-response vectors for each time sample n in the interval $[mN_d,(m+1)N_d-1]$.

Returning to FIG. 4, adaptive filters 412-414 represent the first two and last of J adaptive filters, each of which represents convolving the digital signals $\{x_i[n]\}_I$ with corresponding approximate-impulse-response vectors $\{\vec{h}_{ij}^{(m)}\}_{IJ}$ generated by estimation and tracking block 402 in order to obtain approximate reverberated digital signals $\{\vec{h}_{ij}^{(m)}*x_i[n]\}_{IJ}$. For example, adaptive filter 412 represents convolving the digital signals $\{x_i[n]\}_I$ with the approximate-impulse-response vectors $\{\vec{h}_{i1}^{(m)}\}_I$, respectively, which gives approximate reverberated digital signals $\{\vec{h}_{i1}^{(m)}*x_i[n]\}_I$. In general, the jth adaptive filter represents convolving the digital signals $\{x_i[n]\}_I$ with the approximate-impulse-response vectors $\{\vec{h}_{1j}^{(m)}, \ldots, \vec{h}_{ij}^{(m)}, \ldots, \vec{h}_{Ij}^{(m)}\}$, respectively, in order to obtain approximate reverberated digital signals:

$$\{\hat{\vec{h}}_{1j}^{(m)}*x_1[n], \ldots, \hat{\vec{h}}_{ij}^{(m)}*x_i[n], \ldots, \hat{\vec{h}}_{Ij}^{(m)}*x_I[n]\}$$

Summing the digital signals associated with each of the J adaptive filters produces a set of J approximate acoustic echoes $\{\hat{e}_j[n]\}_J$, where each vector is given by:

$$\hat{e}_j[n] = \sum_{i=1}^{I} \hat{h}_{ij}^{(m)} * x_i[n]$$

The J approximate acoustic echoes $\{\hat{e}_j[n]\}_J$ are correspondingly subtracted from each of the microphone-digital signals $\{y_j[n]\}_J$ at summing junctions, such as summing junctions 416-418, resulting in J controlled digital signals $\{\hat{r}_j[n]\}_J$, each element of which is given by:

$$\hat{r}_j[n] = s_j[n] + e_j[n] - \hat{e}_j[n]$$
$$= s_j[n] + \sum_{i=1}^{I} (\vec{h}_{ij,n} - \hat{h}_{ij}^{(m)}) * x_i[n]$$

The difference $$\Delta e_j[n]=e_j[n]-\hat{e}_j[n]$$

is called the "residual echo." Method embodiments of the present invention carried out by estimation and tracking block 402 are directed to reducing the residual echo. Estimation and tracking block 402 also controls nonlinear processing of each of the controlled digital signals $\{\hat{r}_j[n]\}_J$. For example, nonlinear processing blocks ("NPBs") 420-422 are located in microphone channels 408-410, which represent three of the J nonlinear processes carried out by estimation and tracking block 402. The NPBs attenuate background noise and any residual echo carried by a corresponding controlled digital signal in order to produce J processed digital signals $\{r_j[n]\}_J$.

As described above with reference to FIG. 3A, MECU 302 produces the J processed digital signals $\{r_j[n]\}_J$ which are transmitted to the far room 104 substantially free of acoustic echoes and background noise.

Assuming no audio signals are simultaneously produced in both the near room 102 and the far room 104, a measure of the amount of error incurred by using the approximate impulse responses $\hat{h}^{(m)}$ is given by:

$$f^{(m)}(\hat{h}^{(m)}) = \sum_{n=(m-q)N_d+1}^{mN_d} \left| y_j[n] - \hat{h}^{(m)T}\tilde{x}[n] \right|^2$$

where $$\tilde{x}[n]^T = [x_1[n], \ldots, x_1[n-L+1], \ldots, x_J[n], \ldots, x_J[n-L+1]]$$

and L is the effective size of the echo paths. Here, q denotes the amount of overlap size in blocks. There are several factors contributing to how to choose $N_d$ and q, such as computational resources, sampling frequency, estimation confidence, non-stationarity of speech signals, and movement in the room. In practice, the decision period $N_d$ can range from about 5 ms to about 20 ms, and the overlap size q can range from about 2 to about 4 times the decision period.

The approximate impulse response $\hat{h}^{(m)}$ is determined by minimizing $f^{(m)}(\hat{h}^{(m)})$ with respect to $\hat{h}^{(m)}$. Because of the correlation among excitation signals, however, the method does not solve a system of normal equations, which is either under-determined or ill-conditioned. This postulates a challenge in multichannel echo control called the non-uniqueness problem (see e.g., *Advances in Network and Acoustic Echo Cancellation*, J. Bensty et al., Springer-Verlag, 2001).

Method embodiments employ principle component analysis ("PCA") to determine a model $\mathcal{M}$ that addresses the non-uniqueness problem as follows. Suppose there exists a finite set $\{h_\theta\}_{\theta \in \Theta}$ of possible impulse responses in the near room 102. PCA treats the set $\{h_\theta\}_{\theta \in \Theta}$ as a set of independent random samples and computes the mean and covariance matrix of the set $\{h_\theta\}_{\theta \in \Theta}$ as follows:

$$\overline{h} = \frac{1}{|\Theta|} \sum_\theta h_\theta$$

and $$\Lambda = \sum_\theta \frac{1}{|\Theta|} (h_\theta - \overline{h})(h_\theta - \overline{h})^T$$

where $\overline{h}$ is an estimate for the mean of $\{h_\theta\}_{\theta \in \Theta}$ and $\Lambda$ is the associated covariance matrix of the underlying probability density function. The pair $(\overline{h}, \Lambda)$ forms a mathematical representation of the model $\mathcal{M}$. The large eigenvectors of $\Lambda$ determine the principle directions in which the model is stretched. Over time the performance of the method improves which corresponds to reducing the dimensionality of the model. For example, the model can be a hyper-dimensional ellipsoid that lies within the approximate impulse response space, as shown in FIG. 6B. As shown in FIG. 6B, the eccentricity of the ellipsoid increases and the size and dimensionality of the ellipsoid decreases over time. The direction of skewness of the ellipsoid forms a basis for a low dimensional linear manifold that contains the principle components of the approximate impulse responses. By assigning higher priority to the principle directions and relatively lower priority to other directions as the ellipsoid evolves in time, the method overcomes the non-uniqueness problem during adaptation. Methods of the present invention preserve the audio quality without uncorrelating the excitation signals, once approximate impulse responses associated with echo paths of the room are learned.

The mathematical bases for methods of the present invention are now described. Let $$\Lambda = \begin{bmatrix} U & V \end{bmatrix} \begin{bmatrix} \Sigma & 0 \\ 0 & \Delta \end{bmatrix} \begin{bmatrix} U^T \\ V^T \end{bmatrix}$$

denote the singular value decomposition of $\Lambda$. The singular values of the matrix $\Lambda$ are located in descending order along the diagonal, where $\Sigma$ is a d×d diagonal matrix containing the d largest eigenvalues, and $\Delta$ contains the relatively smaller eigenvalues. U and V are matrices, such that the columns of U define a basis for a d-dimensional subspace that approximates $\{h_\theta - \overline{h}\}_{\theta \in \Theta}$, and V is the orthonormal complement of U (i.e., $V^T U = 0$). In other words, $$\Lambda_d = U \Sigma U^T$$

denotes a d-dimensional approximation of the matrix $\Lambda$ in a minimum mean square sense. Intuitively, when $\{h_\theta\}$ represents all possible impulse responses, it can be expected with relatively high probability that for any impulse response h:

$$V^T(h - \overline{h}) \approx 0$$

which defines a linear manifold in $R^{LIJ}$ that serves as a model for the space of impulse responses. Using this model, $$\min_h f^{(m)}(\hat{h}^{(m)})$$

can be solved subject to the condition $V^T(h - \overline{h}) \approx 0$.

There exists an additional number of LIJ−d equations corresponding to the rank of V. When d is less than or equal to L, the non-uniqueness problem is completely resolved. In practice, $V^T(h - \overline{h})$ is replaced by the constraint $$(h - \overline{h})^T \Lambda^{-1}(h - \overline{h}) \leq 1$$

which enforces the condition $V^T(h - \overline{h}) \approx 0$ and limits the energy of the approximate impulse responses.

B.1 Model Learning

When the method is initialized, the set $\{h_\theta\}_{\theta \in \Theta}$ is the empty set. Hence, initially the model constraint can be the unit Euclidean ball described above with reference to FIG. 6B scaled by an energy factor. More precisely, at decision epoch "0," the constraint is specified by setting:

$$\overline{h}^{(0)} = \hat{h}^{(0)} = 0$$

and the matrix $$\Lambda_0 = \frac{1}{E} \overline{I}$$

where E represents the maximum amplification energy, or gain, produced by a microphone in response to an impulse, and $\overline{I}$ represents the identity matrix.

Method embodiments learn the model through a process that is summarized as follows. When the near room 102 does not experience a change in conditions, $\hat{h}^{(m-1)}$ is not qualified and the following parameters remain unchanged for the next decision epoch:

$$\beta_m^{-1} = \beta_{m-1}^{-1}$$

$$F\overline{h}^{(m)} = F\overline{h}^{(m-1)}$$

$$F\Lambda_{(m)}^{-1} = F\Lambda_{(m-1)}^{-1}$$

$$F\Psi_{(m)}^{-1} = F\Psi_{(m-1)}^{-1}$$

Where $F\hat{h}$ represents the Fourier transform of the elements of $\overline{h}$, and $F\Lambda_{(m-1)}^{-1}$ and $F\Psi_{(m-1)}^{-1}$ are vectors comprising the Fourier transform of the singular values of the matrices $\Lambda_{(m-1)}^{-1}$ and $\Psi_{(m-1)}^{-1}$, respectively. On the other hand, when the near room 102 experiences a change in conditions, $\hat{h}^{(m-1)}$ is qualified and the parameters are adjusted to account for changing conditions in the room as follows:

$$\beta_m^{-1} = \beta_{m-1}^{-1} + 1$$

$$F\overline{h}^{(m)} = (1 - \beta_m) F\overline{h}^{(m-1)} + \beta_m F\hat{h}^{(m-1)}$$

$$F\Lambda_{(m)}^{-1} = F\Lambda_{(m-1)}^{-1} - \frac{\left|F\Psi_{m-1}^{-1} \cdot F\hat{h}^{(m-1)}\right|^2}{1 + \left|F\hat{h}^{(m-1)}\right|^2 \square F\Psi_{m-1}^{-1}}$$

$$F\Psi_{(m)}^{-1} = \beta_m^{-1}\left(F\Psi_{(m-1)}^{-1} - \frac{\left|F\Psi_{(m-1)}^{-1} \cdot F\overline{h}^{(m-1)}\right|^2}{\left|F\overline{h}^{(m-1)}\right|^2 \square F\Psi_{(m)}^{-1} - \beta_m}\right)$$

where "F" means Fourier transform, $F\Lambda_{(m)}^{-1}$ and $F\Psi_{(m)}^{-1}$ are vectors comprising the Fourier transform of the singular values of the matrices $\Lambda_{(m)}^{-1}$ and $\Psi_{(m)}^{-1}$, respectively;

"$\circ$" means element-wise product of two vectors;

"$\cdot$" means scalar product of two vectors; and

"$\|\,\|^2$" means element-wise square magnitude of a vector.

In certain cases, the model is transformed into an ellipsoid as described above with reference to FIG. 6B.

B.2 Approximating Impulse Responses

The model of the impulse response space described in section B.1 serves as a trust region in the search for the next best approximate impulse response. Suppose the previous approximate impulse response is $\hat{h}^{(m-1)}$ and audio signals are not simultaneously output from both the near room 102 and the far room 104. In order to find the next approximate impulse response $\hat{h}^{(m)}$, the method seeks a direction p obtain by solving:

$$\min_h f^{(m)}(\hat{h}^{(m)})$$

such that $$\|p + \hat{h}^{(m-1)} - \overline{h}^{(m)}\|^2 \leq 1$$

Solving for p gives:

$$(\nabla^2 f^{(m)}(\hat{h}^{(m-1)}) + \lambda \Lambda_{(m)}^{-1}) p_m = -\nabla f^{(m)}(\hat{h}^{(m-1)}) - \lambda \Lambda_{(m)}^{-1}(\hat{h}^{(m-1)} - \overline{h}^{(m)})$$

where $\lambda$ is the Lagrange multiplier. The method takes $v_m \ll 1$ as the learning factor and computes $$\hat{h}^{(m)} = \hat{h}^{(m-1)} + v_m p_m$$

as the approximate impulse response for the decision epoch m. The method has $$v_m = O\left(\frac{1}{m - m_o}\right)$$

where $m_o$ denotes the decision epoch corresponding to the last change in the impulse response.

C. Implementation

Various embodiments of the present invention are directed to real-time, adaptive acoustic echo cancellation methods in multichannel audio-communication systems. In particular, these methods reduce acoustic echoes in a plurality of audio signals transmitted between a first location and a second over multichannel audio-communication systems. The communication system embodiments of the present invention can be electronic presentations, voice mail, audio-conference communication systems or any other type of communication system capable of transmitting audio signals between a first location and a second location. A plurality of microphones and loudspeakers are employed at the first location and the second location. Method embodiments of the present invention compute a control state for each acoustic coupling between microphones and loudspeakers. The control state characterizes one of the following four types of communications: (1) sound transmitted from the first location only; (2) sound transmitted from the second location only; (3) sounds transmitted simultaneously between the first and second locations; and (4) no sound transmitted between the first and second locations. For each of the signals detected by the microphones located at the first location, the methods then compute approximate acoustic echoes based on the control state. The method subtracts the corresponding computed, approximate acoustic echoes from each of the digital signals that are transmitted from the second location to the first location and adjusts these signals for gain before the signals are output at the first location.

The estimation and tracking 402 may also include direct current ("DC") offset removal for signals transmitted between near room 102 and estimation and tracking 402. DC offset is a low-frequency distortion often caused by electrical interference. This electrical interference creates a constant voltage that can cause clicks and pops in the sound output from a loudspeaker. DC offset removal corrects the DC offset in each of the digital signals $\{x_i[n]\}_I$ produced in the far room 104 as follows:

$$x_i[n] = ax_i[n-1] + 0.5(1+a)(x_i[n] - x_i[n-1])$$

where a is a constant ranging from about 0.9 to about 0.9999, and corrects the DC offset in each of the microphone-digital signals $\{y_j[n]\}_J$ produced in the near room 102 as follows:

$$y_j[n] = ay_j[n-1] + 0.5(1+a)(y_j[n] - y_j[n-1])$$

Control-flow diagrams shown in FIGS. 6-13 and the following discussion provide a description of one of many method embodiments for reducing an acoustic echo in microphone-digital signals $\{y_j[n]\}_J$ and generating associated processed digital signals $\{r_j[n]\}_J$.

Figure 6:
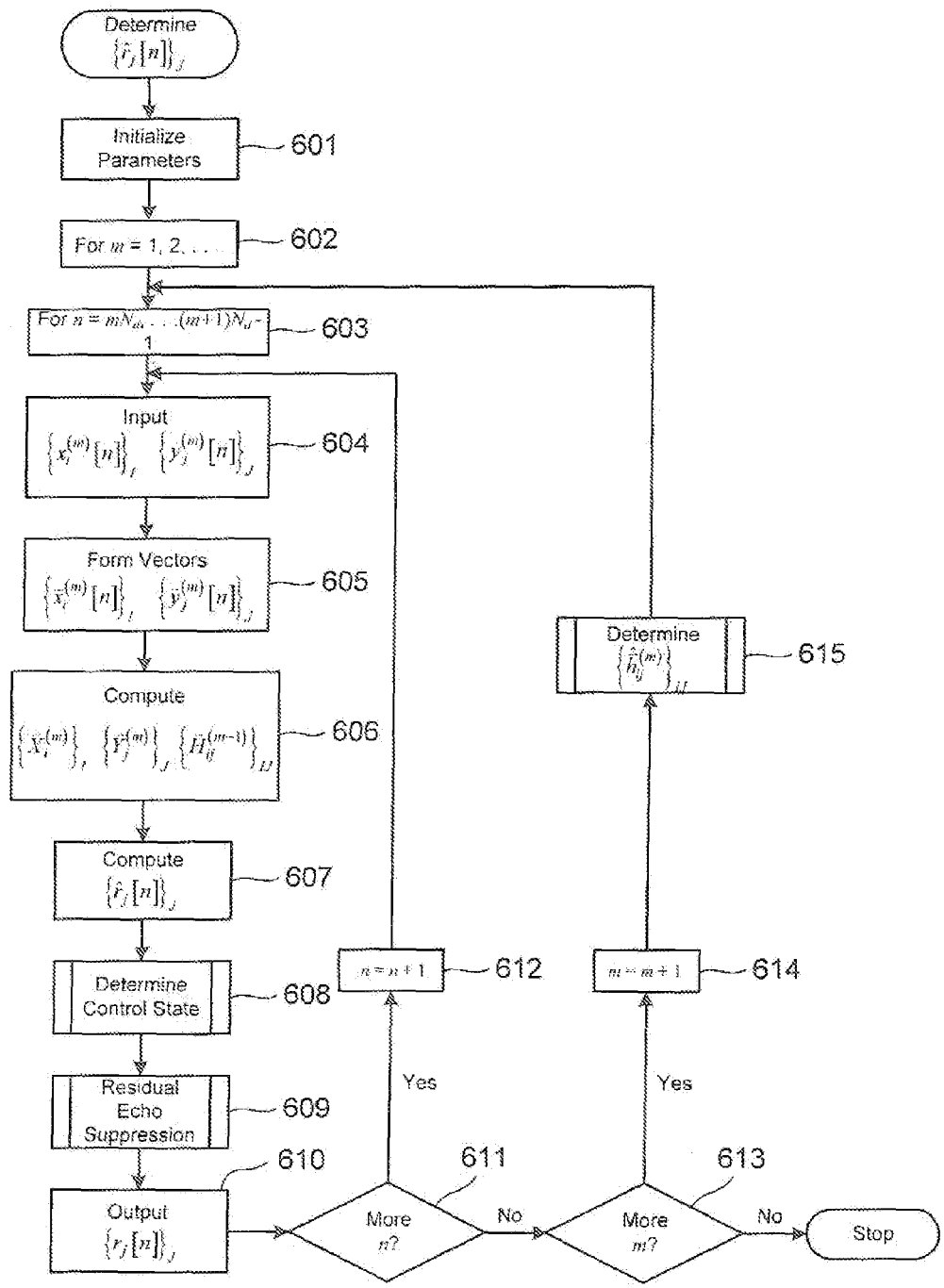
FIG. 6 shows a control-flow diagram that represents an embodiment of the present invention for reducing acoustic echoes in a plurality of audio signals transmitted from a first location to a second location.

FIG. 6 shows a control-flow diagram that represents an embodiment of the present invention for reducing acoustic echoes in a plurality of audio signals that are transmitted from near room 102 to far room 104. In step 601 of FIG. 6, parameters used in the equations described below are initialized. Tables 1-3 display these parameters and associated example initial values that may be used in certain applications. Note that values displayed in Tables 1-3 depend on the room setup and sampling rate, and therefore, are subject to change.

Table 1 displays constants that typically remain unchanged during operation of the method embodiments of the present invention. Table 1 also includes example values associated with each of the constants.

TABLE 1

| Parameter | Value |
|---|---|
| L | 10000 |
| $N_d$ | 288 |
| P | 5 |
| N | $(N_d)$ |
|   | 8192 |
| β | 0.001 |
| η | 0.001 |
| λ | 0.001 |
| $K_1$ | 0.995 |
| $K_2$ | 0.3 |
| $G_{max}$ | 1.0 |
| $G_{min}$ | 0.1 |
| M | 12 |

Note that the values associated with the parameters displayed in Table 1 can be adjusted based on different near and far room conditions and room configurations. The parameter P is the number of digital signals $y_j^{(m)}[n]$ in the digital signal vector $\vec{y}_j^{(m)}[n]$ described below with reference to step 604 in FIG. 6. The parameter N is the number of digital signals in the frequency domain vectors $\vec{X}_i^{(m)}$, $\vec{Y}_j^{(m)}$, and $\vec{H}_{ij}^{(m)}$. The parameters β, η, λ, $K_1$, and $K_2$ are values that are used to assign relative importance or weight to terms in equations described below with reference to FIGS. 6-10. The parameters $G_{max}$ and $G_{min}$ are the maximum and minimum gain associated with each of the J microphones. The parameter M is used during double talk described below with reference to FIG. 6.

Table 2 shows initial values for variable parameters that change during iterations of the methods described below with reference to FIGS. 7-8:

TABLE 2

| Parameter | Initial Value |
|---|---|
| $\dot{\sigma}_{i,x}^{2(0)}$ | 0.01 |
| $\dot{\sigma}_{j,y}^{2(0)}$ | 0.01 |
| $\sigma_{j,\hat{r}}^{2(0)}$ | 0.01 |
| $\ddot{\sigma}_{j,n}^{2(0)}$ | 0.01 |
| $\ddot{\sigma}_{i,x}^{2(0)}$ | 0.01 |
| $\ddot{\sigma}_{j,y}^{2(0)}$ | 0.01 |
| $M_{i,x}^{2(0)}$ | 0 |
| $M_{j,y}^{2(0)}$ | 0 |
| $G^{(0)}$ | 0 |

The parameters $\dot{\sigma}_{i,x}^{2(0)}$ and $\dot{\sigma}_{j,y}^{2(0)}$ are short-term energy variances associated with the digital signals $x_i^{(m)}[n]$ and $y_j^{(m)}[n]$, respectively. The parameter $\dot{\sigma}_{j,\hat{r}}^{2(0)}$ is the short-term energy variance associated with the energy in the controlled digital signal $\hat{r}_j[n]$. The parameters $\sigma_{i,x}^{2(0)}$ and $\sigma_{j,y}^{2(0)}$ are long-term energy variances associated with the digital signals $x_i^{(m)}[n]$ and $y_j^{(m)}[n]$, respectively. The parameter $\sigma_{j,n}^{2(0)}$ is a long-term energy variance associated with noise. The parameters $M_{i,x}^{2(0)}$ and $M_{j,y}^{2(0)}$ are maximum square energies associated with the digital signals $x_i^{(m)}[n]$ and $y_j^{(m)}[n]$. The parameter $G^{(0)}$ is an initial gain adaptation value described below with reference to FIG. 8.

Table 3 shows initial values for components of vectors $\vec{S}_{i,xx}^{(0)}$, $\vec{S}_{j,\hat{r}\hat{r}}^{(0)}$, $\vec{\Lambda}_{ij}^{(0)}$, $\hat{\vec{h}}_{ij}^{(0)}$, and $\hat{\vec{h}}_{ij}^{(0)}$ that change during iterations of the method described below with reference to FIGS. 13-14:

TABLE 3

| Vector Component | Initial Value | Component Index |
|---|---|---|
| $S_{i,xx}^{(0)}[k]$ | 1.0 | k = 0, ..., N − 1 |
| $S_{j,\hat{r}\hat{r}}^{(0)}[k]$ | 1.0 | k = 0, ..., N − 1 |
| $\Lambda_{ij}^{(0)}[n']$ | 1.0 | n' = 0, ..., L − 1 |
| $\tilde{h}_{ij}^{(0)}[n']$ | 1.0 | n' = 0, ..., L − 1 |
| $\hat{h}_{ij}^{(0)}[n']$ | 0.0 | n' = 0, ..., L − 1 |

The vector $\vec{S}_{i,xx}^{(0)}$ is an initial average spectrum associated with the vector $\vec{X}_i^{(m)}$, and the vector $\vec{S}_{j,\hat{r}\hat{r}}^{(0)}$ is an initial average spectrum associated with a vector $\vec{R}_j^{(m)}$, which are described below with reference to step 1002 in FIG. 10. The vector $\vec{\Lambda}_{ij}^{(0)}$ defines an evolving trust region described below with reference to step 1005 in FIG. 10. The vector $\tilde{\vec{h}}_{ij}^{(0)}$ is an initial shadow-impulse-response vector described below with reference to step 1408 in FIG. 10. The vector $\hat{\vec{h}}_{ij}^{(0)}$ is an initial approximate-impulse-response vector described below with reference to step 1009 in FIG. 10.

In the for-loop beginning in step 602, steps 603-615 are repeated for each decision epoch m. In the for-loop beginning in step 603, steps 604-612 are repeated for each time sample n. In step 604, the estimation and tracking unit 302 receives I digital signals $\{x_i^{(m)}[n]\}_I$ output from the far room 104, and J digital signals $\{y_j^{(m)}[n]\}_J$ output from the near room 102. In step 605, a set of digital signal vectors $\{\vec{x}_i^{(m)}[n]\}_I$ is formed, where each digital signal vector is an (L+P)-component digital signal vector:

$$\vec{x}_i^{(m)}[n] = \begin{bmatrix} x_i^{(m)}[n] \\ x_i^{(m)}[n-1] \\ \vdots \\ x_i^{(m)}[n-(L+P-1)] \end{bmatrix}$$

formed from the digital signal $x_i^{(m)}[n]$ and L+P−1 previous digital signals $x_i^{(m)}[n]$, and a set of microphone-digital signal vectors $\{\vec{y}_j^{(m)}[n]\}_J$ is formed, where each microphone-digital signal vector is a P-component microphone-digital signal vector $$\vec{y}_j^{(m)}[n] = \begin{bmatrix} y_j^{(m)}[n] \\ y_j^{(m)}[n-1] \\ \vdots \\ y_j^{(m)}[n-(P-1)] \end{bmatrix}$$

formed from the microphone-digital signal $y_j^{(m)}[n]$ and P−1 previous digital signals $y_j^{(m)}[n]$. In step 606, a fast Fourier transformation ("FFT") is applied to the each vector in the sets $\{\vec{x}_i^{(m)}[n]\}_I$, $\{\vec{y}_j^{(m)}[n]\}_J$ and $\{\hat{\vec{h}}_{ij}^{(m-1)}\}_{IJ}$ in order to obtain corresponding sets of domain frequency vectors $\{\vec{X}_i^{(m)}\}_I$, $\{\vec{Y}_j^{(m)}\}_J$ and $\{\hat{\vec{H}}_{ij}^{(m-1)}\}_{IJ}$, where vector elements are given by:

$$\overline{X}_i^{(m)} = \begin{bmatrix} X_i^{(m)}[0] \\ X_i^{(m)}[1] \\ \vdots \\ X_i^{(m)}[N-1] \end{bmatrix} = FFT \left\{ \begin{bmatrix} x_i^{(m)}[n] \\ x_i^{(m)}[n-1] \\ \vdots \\ x_i^{(m)}[n-(L+P-1)] \end{bmatrix} \right\},$$

$$\overline{Y}_j^{(m)} = \begin{bmatrix} Y_j^{(m)}[0] \\ Y_j^{(m)}[1] \\ \vdots \\ Y_j^{(m)}[N-1] \end{bmatrix} = FFT \left\{ \begin{bmatrix} y_j^{(m)}[n] \\ y_j^{(m)}[n-1] \\ \vdots \\ y_j^{(m)}[n-(P-1)] \end{bmatrix} \right\}, \text{ and}$$

$$\hat{\overline{H}}_{ij}^{(m-1)} = \begin{bmatrix} \hat{H}_{ij}^{(m-1)}[0] \\ \hat{H}_{ij}^{(m-1)}[1] \\ \vdots \\ \hat{H}_{ij}^{(m-1)}[N-1] \end{bmatrix} = FFT \left\{ \begin{bmatrix} \hat{h}_{ij}^{(m-1)}[n] \\ \hat{h}_{ij}^{(m-1)}[n-1] \\ \vdots \\ \hat{h}_{ij}^{(m-1)}[n-(L-1)] \end{bmatrix} \right\}$$

An FFT and a corresponding inverse fast Fourier transform ("IFFT") are types of Fourier transformations that are often employed to avoid carrying out convolution in the time sample domain. Using the FFT and the IFFT can be hundreds or even thousands of times faster than convolving digital signals in the time sample domain. A number of different FFT and IFFT methods are described in the book *Discrete-Time Signal Processing* ($2^{nd}$ Edition), by A. Oppenhiemer, R. Schafer, with J. Buck, Prentice Hall, Inc., (1999-2000), which is just one of many references for the field of digital signal processing. Additional details can be obtained from the above-referenced book, or from many other textbooks, papers, and journal articles in this field. In step 607, a set of controlled digital signal vectors $\{\hat{\vec{r}}_j^{(m)}[n]\}_J$ are computed, where each controlled digital signal vector is computed as follows:

$$\hat{\vec{r}}_j^{(m)}[n] = Tr_{N_d} \cdot IFFT \left\{ \overline{Y}_j^{(m)} - \sum_{i=1}^{I} \overline{X}_i^{(m)} \cdot (\hat{\overline{H}}_{ij}^{(m-1)})^* \right\}$$

where $Tr_{N_j}$ is a truncation operator of length $N_d$,

"∘" represents component-wise multiplication of two vectors, $$\hat{\vec{r}}_j^{(m)}[n] = \begin{bmatrix} \hat{r}_j^{(m)}[n] \\ \hat{r}_j^{(m)}[n-1] \\ \vdots \\ \hat{r}_j^{(m)}[n-(N_d-1)] \end{bmatrix}, \text{ and } \sum_{i=1}^{I} \overline{X}_i^{(m)} \cdot (\hat{\overline{H}}_{ij}^{(m-1)})^*$$

represents the frequency domain acoustic echo in the jth microphone-digital signal.

In step 608, the routine "determine control state" is called, which identifies four types of audio signal transmissions that can exist between the near room 102 and the far room 104. The four types of audio signal transmissions are called "control states" ("CS") and are identified as follows: (1) an audio signal is output from the near end room 102 only and is represented by $S_{NEO}$; (2) an audio signal is output from the far end room 104 only and is represented by $S_{FEO}$; (3) audio signals are simultaneously output from both the near end room 102 and the far end room 104, which is called "double-talk," is represented by $S_{DT}$; and (4) no audio signals output from the near end room 102 and the far end room 104 is represented by $S_{NS}$. In step 609, the routine "residual echo suppression" is called in order to compute J gain-corrected processed digital signals $\{r_j^{(m)}[n]\}_J$. In step 610, the processed digital signals $\{r_j^{(m)}[n]\}_J$ are transmitted to the far room 104. In step 611, when n is less than or equal to (m+1) $N_d-1$, control passes to step 612, otherwise control passes to step 613. In step 612, the time sample n is incremented by "1," and steps 604-611 are repeated. In other words, the approximate-impulse-response vectors $\{\hat{\vec{h}}_{ij,n}\}_{IJ}$ are not updated during the $N_d$ decision period. In step 613, when another decision epoch m is available, control passes to step 614, otherwise the routine "determine $\{r_j[n]\}_J$" is terminated. In step 614, the decision epoch m is incremented by "1." In step 615, the routine "determine $\{\hat{\vec{h}}_{ij,n}\}_{IJ}$" is called. In other words, a new decision period with $N_d$ decision epochs is initiated and the approximate impulse response vectors are updated.

Figure 7A:
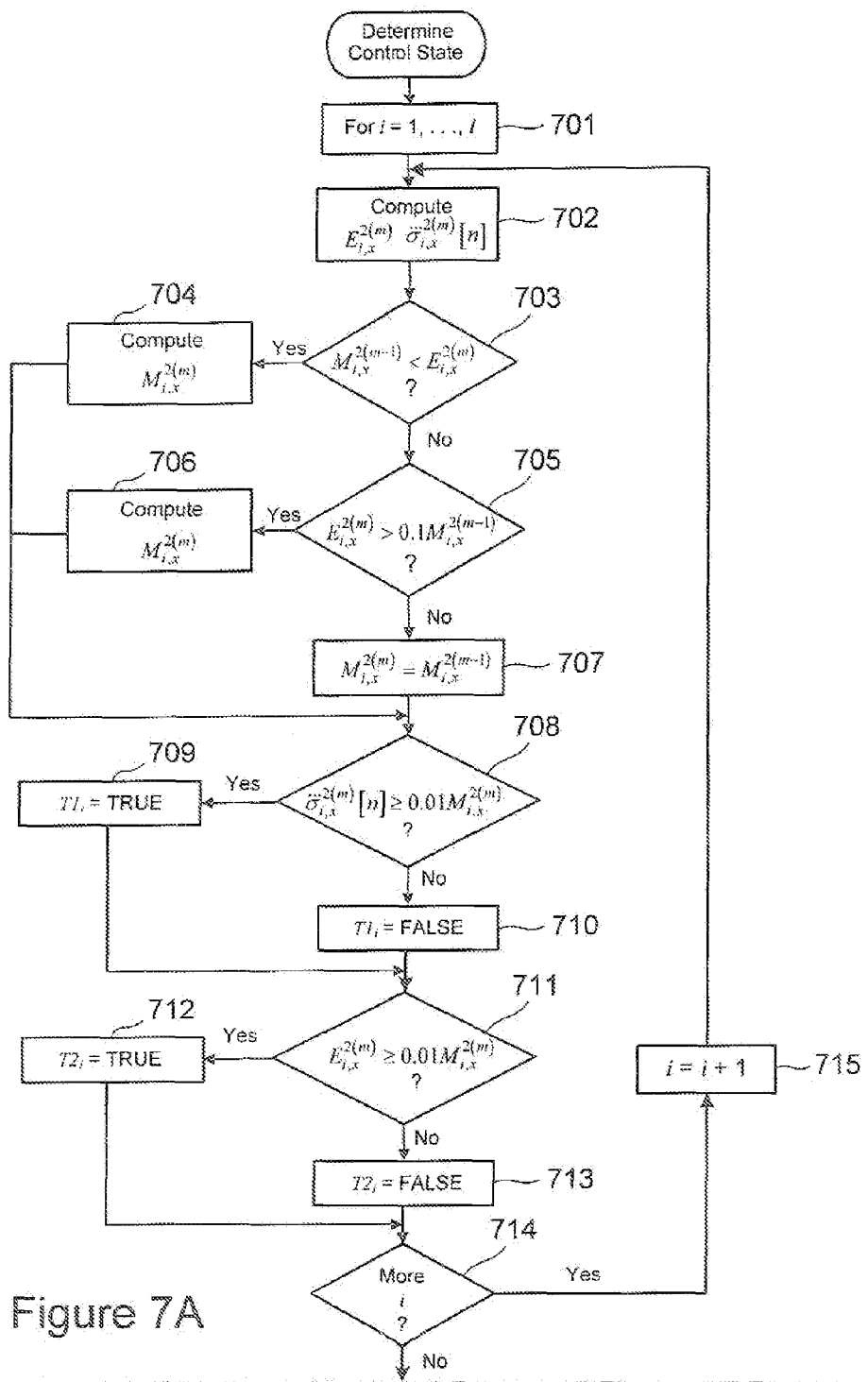
FIGS. 7A-7C show a control-flow diagram for the routine "determine control state" called in step 608 in FIG. 6 and represents an embodiment of the present invention.
Figure 7B:
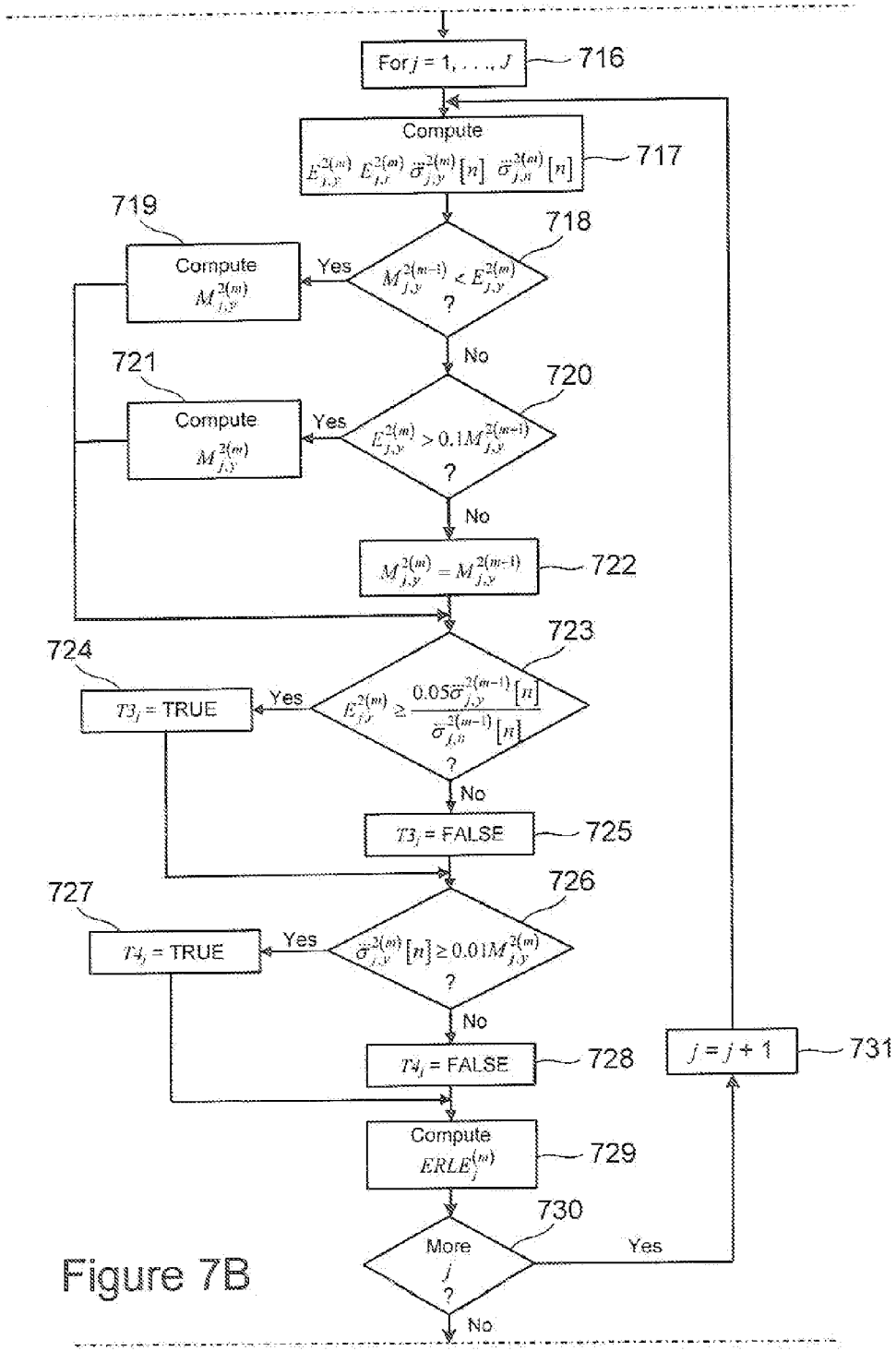
Figure 7C:
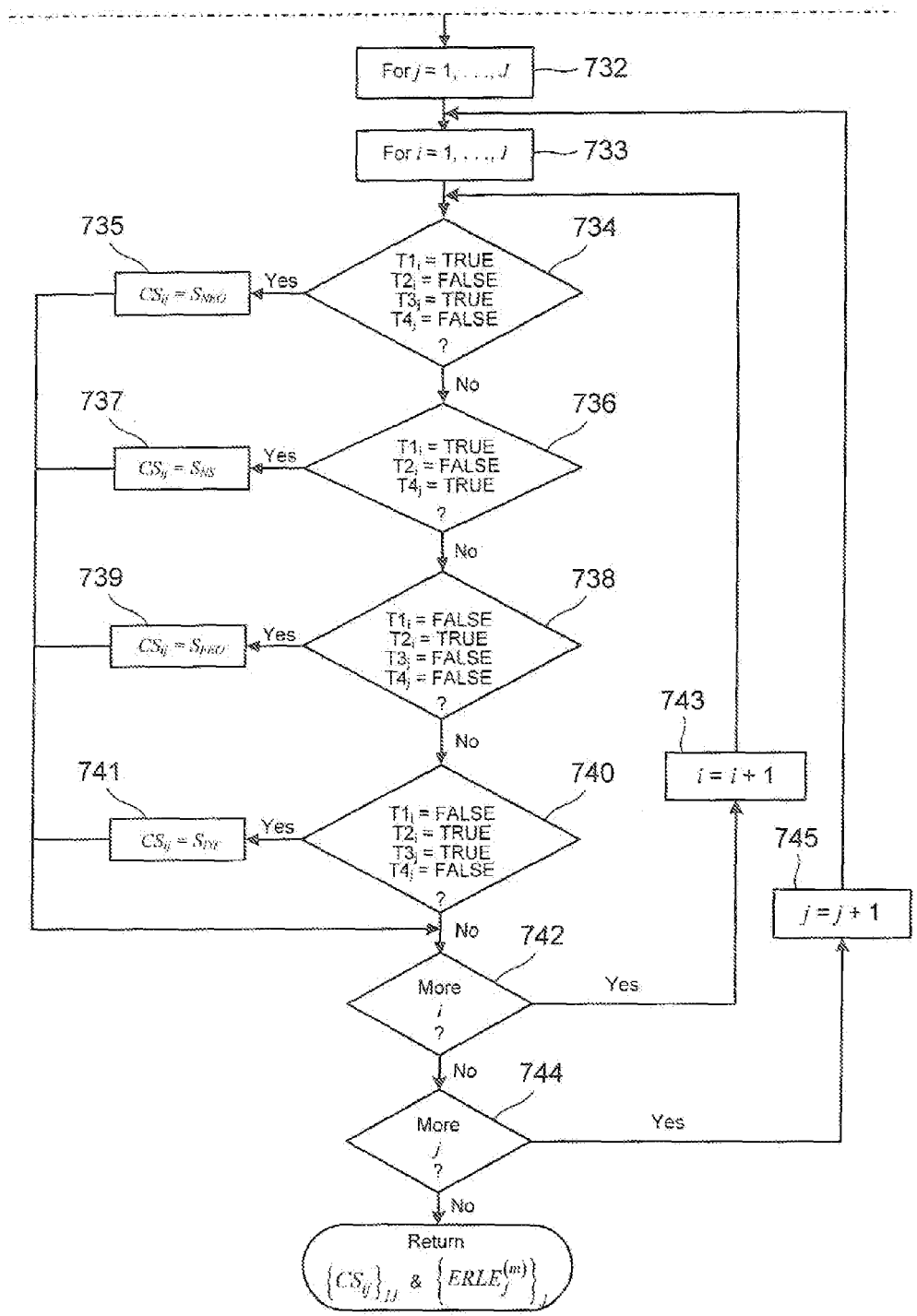

FIGS. 7A-7C show a control-flow diagram for the routine "determine control state" called in step 608 in FIG. 6 and represents an embodiment of the present invention. In the for-loop beginning in step 701 of FIG. 7A, steps 702-714 are repeated for each index $i \in \{1, \ldots, I\}$. In step 702, an average square energy associated with the vector $\vec{x}_i^{(m)}[n]$ is computed as follows:

$$E_{i,x}^{2(m)} = \|\vec{x}_i^{(m)}[n]\|^2,$$

and a long-term energy variances is recursively determined for the average square energies by:

$$\sigma_{i,x}^{2(m)}[n] = 0.99 \sigma_{i,x}^{2(m-1)}[n] + 0.001 E_{i,x}^{2(m)}$$

In steps 703-707, a maximum square energy $M_{i,x}^{2(m)}$ associated with the digital signal vector $\vec{x}_i^{(m)}[n]$ is determined. In step 703, when the maximum square energy $M_{i,x}^{2(m-1)}$ is less than the average square energy $E_{i,x}^{2(m)}$ control passes to step 704, otherwise control passes to step 705. In step 704, the maximum square energy is computed by:

$$M_{i,x}^{2(m)} = \min\{E_{i,x}^{2(m)}, 10 M_{i,x}^{2(m-1)}\}$$

and control passes to step 708. In step 705, when the average square energy $E_{i,x}^{2(m)}$ is greater than $0.1 M_{i,x}^{2(m-1)}$ control passes to step 706, otherwise control passes to step 707. In step 706, the maximum square energy is computed by:

$$M_{i,x}^{2(m)} = 0.999 M_{i,x}^{2(m-1)} + 0.001 E_{i,x}^{2(m)}$$

and control passes to step 708. In step 707, the maximum square energy $M_{i,x}^{2(m)}$ is assigned the value of $M_{i,x}^{2(m-1)}$ from the previous decision period. In steps 708-713, Boolean logic values "TRUE" and "FALSE" are assigned to Boolean variables $T1_i$, $T2_i$. In step 708, when the long-term variance $\sigma_{i,x}^{2(m)}[n]$ is greater than or equal to $0.01 M_{i,x}^{2(m)}$, control passes to step 709 and $T1_i$ is set to "TRUE," otherwise control passes to step 710 and $T1_i$ is set to "FALSE." In step 711, when the average square energy $E_{i,x}^{2(m)}$ is greater than or equal to $0.01 M_{i,x}^{2(m)}$, control passes to step 712 and $T2_i$ is set to "TRUE," otherwise control passes to step 714 and $T2_i$ is set to "FALSE." In step 714, when i is greater than I control passes to step 716, in FIG. 7B, otherwise control passes to step 715. In step 715, i is incremented by "1" and steps 702-714 are repeated.

In the for-loop beginning in step 716 of FIG. 7B, steps 717-731 are repeated for each index $j \in \{1, \ldots J\}$. In step 716, average energies are computed for $\vec{y}_j^{(m)}[n]$, $\hat{\vec{r}}_j^{(m)}[n]$, and a shadow-error vector $\tilde{\vec{r}}_j^{(m)}[n]$ as follows:

$$E_{j,y}^{2(m)} = \|\vec{y}_j^{(m)}[n]\|^2,$$

$$E_{j,r}^{2(m)} = \|\hat{\vec{r}}_j^{(m)}[n]\|^2, \text{ and}$$

$$E_{j,\tilde{r}}^{2(m)} = \|\tilde{\vec{r}}_j^{(m)}[n]\|^2$$

and long-term energy variances are recursively determined for the average square energies by:

$$\bar{\sigma}_{j,y}^{2(m)}[n] = 0.99 \bar{\sigma}_{j,y}^{2(m-1)}[n] + 0.001 E_{j,y}^{2(m)}, \text{ and}$$

$$\bar{\sigma}_{j,n}^{2(m)}[n] = 0.99 \bar{\sigma}_{j,n}^{2(m-1)}[n] + 0.01 E_{j,\tilde{r}}^{2(m)}$$

In steps 718-722, a maximum square energy $M_{i,y}^{2(m)}$ associated with the digital signal vector $\vec{y}_i^{(m)}[n]$ is determined. In step 718, when the maximum square energy $M_{i,y}^{2(m-1)}$ is less than the average square energy $E_{i,y}^{2(m)}$ control passes to step 719, otherwise control passes to step 720. In step 719, the maximum square energy is computed by:

$$M_{i,y}^{2(m)} = \min\{E_{i,y}^{2(m)}, 10 M_{i,y}^{2(m-1)}\}$$

and control passes to step 723. In step 720, when the average square energy $E_{i,y}^{2(m)}$ is greater than $0.1 M_{i,y}^{2(m-1)}$ control passes to step 721, otherwise control passes to step 721. In step 721, the maximum square energy is computed by:

$$M_{i,y}^{2(m)} = 0.999 M_{i,y}^{2(m-1)} + 0.001 E_{i,y}^{2(m)}$$

and control passes to step 723. In steps 723-728, Boolean logic values "TRUE" and "FALSE" are assigned to Boolean variables $T3_j$, $T4_j$. In step 723, when the average square energy $E_{j,\tilde{r}}^{2(m)}$ is greater than or equal to $0.05 \bar{\sigma}_{j,n}^{2(m-1)}[n] / \bar{\sigma}_{j,n}^{2(m-1)}[n]$, control passes to step 724 and $T3_j$ is set to "TRUE," otherwise control passes to step 725 and $T3_j$ is set to "FALSE." In step 726, when the long-term variance $\bar{\sigma}_{j,y}^{2(m)}[n]$ is greater than or equal to $0.01 M_{j,y}^{2(m)}$, control passes to step 727 and $T4_j$ is set to "TRUE," otherwise control passes to step 728 and $T4_j$ is set to "FALSE." In step 729, an echo return loss enhancement value ("ERLE") is calculated according to:

$$ERLE_j^{(m)} = 10 \log_{10}\left(\frac{\dot{\sigma}_{j,y}^{2(m)}[n]}{\dot{\sigma}_{j,\tilde{r}}^{2(m)}[n]}\right)$$

where $$\dot{\sigma}_{j,y}^{2(m)}[n] = 0.8 \dot{\sigma}_{j,y}^{2(m-1)}[n] + 0.2 E_{j,y}^{2(m)}, \text{ and}$$

$$\dot{\sigma}_{j,\tilde{r}}^{2(m)}[n] = 0.8 \dot{\sigma}_{j,\tilde{r}}^{2(m-1)}[n] + 0.2 E_{j,\tilde{r}}^{2(m)}$$

are short-term variances associated with the average square energies $E_{i,x}^{2(m)}$ and $E_{j,\tilde{r}}^{2(m)}$, respectively. The ERLE can be used to gauge the performance of acoustic echo cancellation when the system is in the state $S_{FEO}$ and determine approximate-impulse-response vectors when the system is in double talk described below in step 1309 of FIG. 13A. In step 730, when j is greater than J control passes to step 732, in FIG. 7C, otherwise control passes to step 731. In step 731, j is incremented by "1" and steps 717-730 are repeated.

In the for-loop beginning in step 732 of FIG. 7C, steps 733-745 are repeated for each $j \in \{1, \ldots J\}$. In the for-loop beginning in step 733, steps 734-743 are repeated for each $i \in \{1, \ldots, I\}$. In steps 734-741, the Boolean logic values determined in steps 708-713 in FIG. 7A and steps 723-728 in FIG. 7B are used to determine a control state $CS_{ij}$ for each echo path. In step 734, when $T1_i$ and $T3_j$ are "TRUE," and $T2_i$ and $T4_j$ are "FALSE," control passes to step 735 and $CS_{ij}$ is assigned $S_{NEO}$, otherwise control passes to step 736. In step 736, when $T1_i$ and $T4_j$ are "TRUE," and $T2_i$ is "FALSE," control passes to step 737, and $CS_{ij}$ is assigned $S_{NS}$, otherwise control passes to step 738. In step 738, when $T2_i$ is "TRUE" and $T1_i$, $T3_j$, and $T4_j$ are "FALSE," control passes to step 739, and $CS_{ij}$ is assigned $S_{FEO}$, otherwise control passes to step 740. In step 740, when $T2_i$ and $T3_j$ are "TRUE," and $T1_i$ and $T4_j$ are "FALSE," control passes to step 741, and $CS_{ij}$ is assigned $S_{DT}$, otherwise control passes to step 742. In step 742, when i is greater than I control passes to step 744, otherwise control passes to step 743. In step 743, i is incremented by "1" and steps 734-742 are repeated. In step 744, when j is greater than J, $\{CS_{ij}\}_{I,J}$ and $\{ERLE_j^{(m)}\}_J$ are returned, otherwise, in step 745, j is incremented by "1" and steps 733-744 are repeated.

Figure 8:
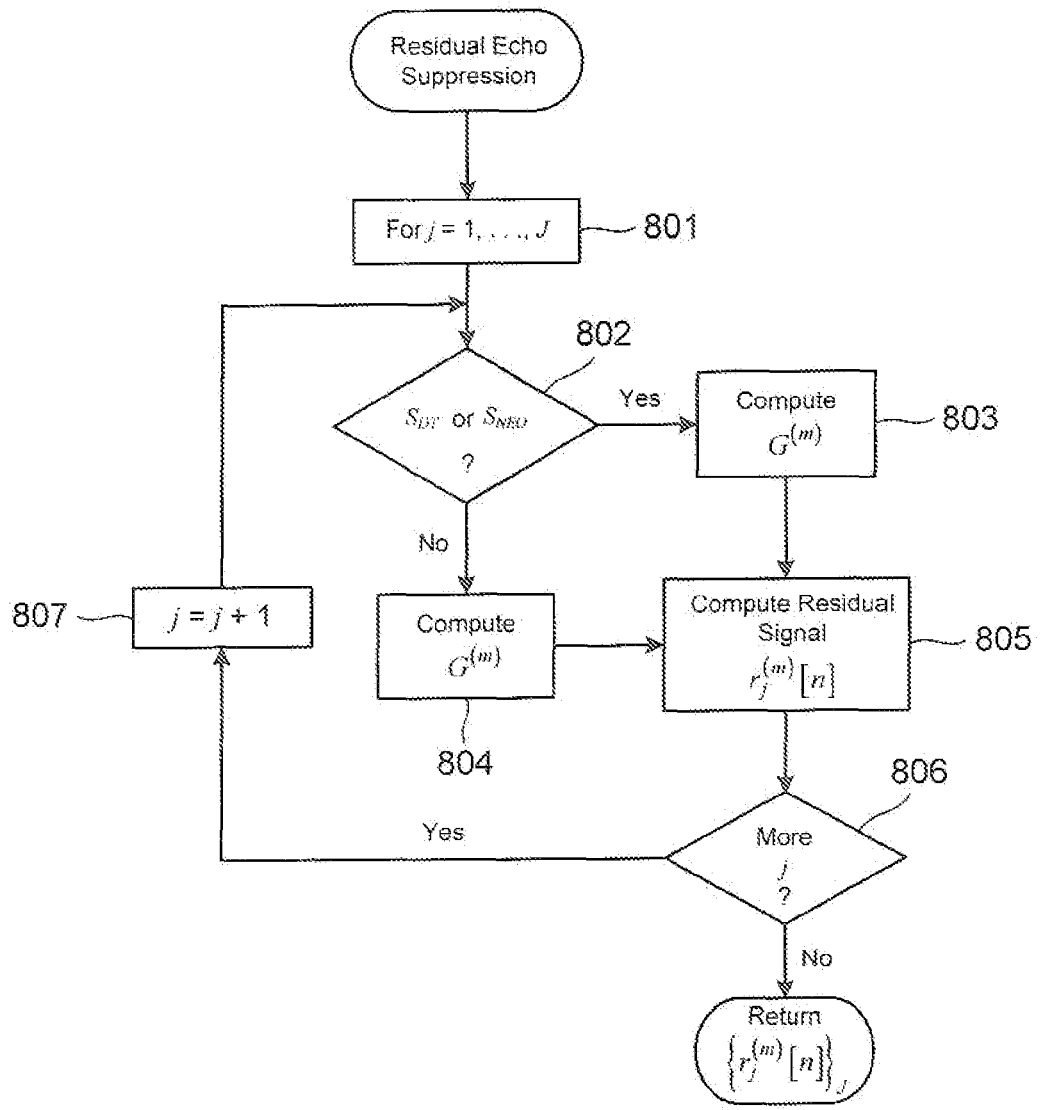
FIG. 8 is a control-flow diagram for the routine "residual echo suppression" called in step 609 in FIG. 6 and represents an embodiment of the present invention.

FIG. 8 is a control-flow diagram for the routine "residual echo suppression" called in step 609 in FIG. 6 and represents an embodiment of the present invention. In the for-loop beginning in step 801, steps 802-807 are repeated for each index j. The control states of the audio transmission are used to correct for gain in each of the processed digital signals $\{r_j^{(m)}[n]\}_J$. For example, during double-talk, or when an audio signal is produced in the near room 102 only, the gain acquired by the controlled digital signals $\{\hat{r}_j^{(m)}[n]\}_J$ is larger than when an audio signal is produced only in the far room 104 or when there is no audio signal transmitted at all. The maximum and minimum amounts of gain that the controlled digital signal can acquire are represented by the constants $G_{max}$ and $G_{min}$, respectively. Steps 802-805 adjust the gain in each of the processed digital signals $\{r_j^{(m)}[n]\}_J$. In step 802, when there is double talk or sound produced in the near room 102 only, control passes to step 803, otherwise control passes to step 804. In step 803, the gain is computed as follows:

$$G^{(m)} = K_2 G^{(m-1)} + (1-K_2) G_{max}$$

where $K_2$ is a weight assigning a lower relative importance to $G^{(m-1)}$ than to the maximum gain $G_{max}$. In step 804, the gain is computed as follows:

$$G^{(m)} = K_1 G^{(m-1)} + (1-K_1) G_{min}$$

where $K_1$ is a weight assigning a relatively higher importance to $G^{(m-1)}$ than to the minimum gain $G_{min}$. In step 805, the jth processed digital signal is determined by:

$$r_j^{(m)}[n] = G^{(m)} \hat{r}_j^{(m)}[n]$$

In step 806, when j is less than or equal to J, control passes to step 807 and j is incremented by "1," otherwise processed digital signals $\{r_j^{(m)}[n]\}_J$ are returned.

Figure 9A:
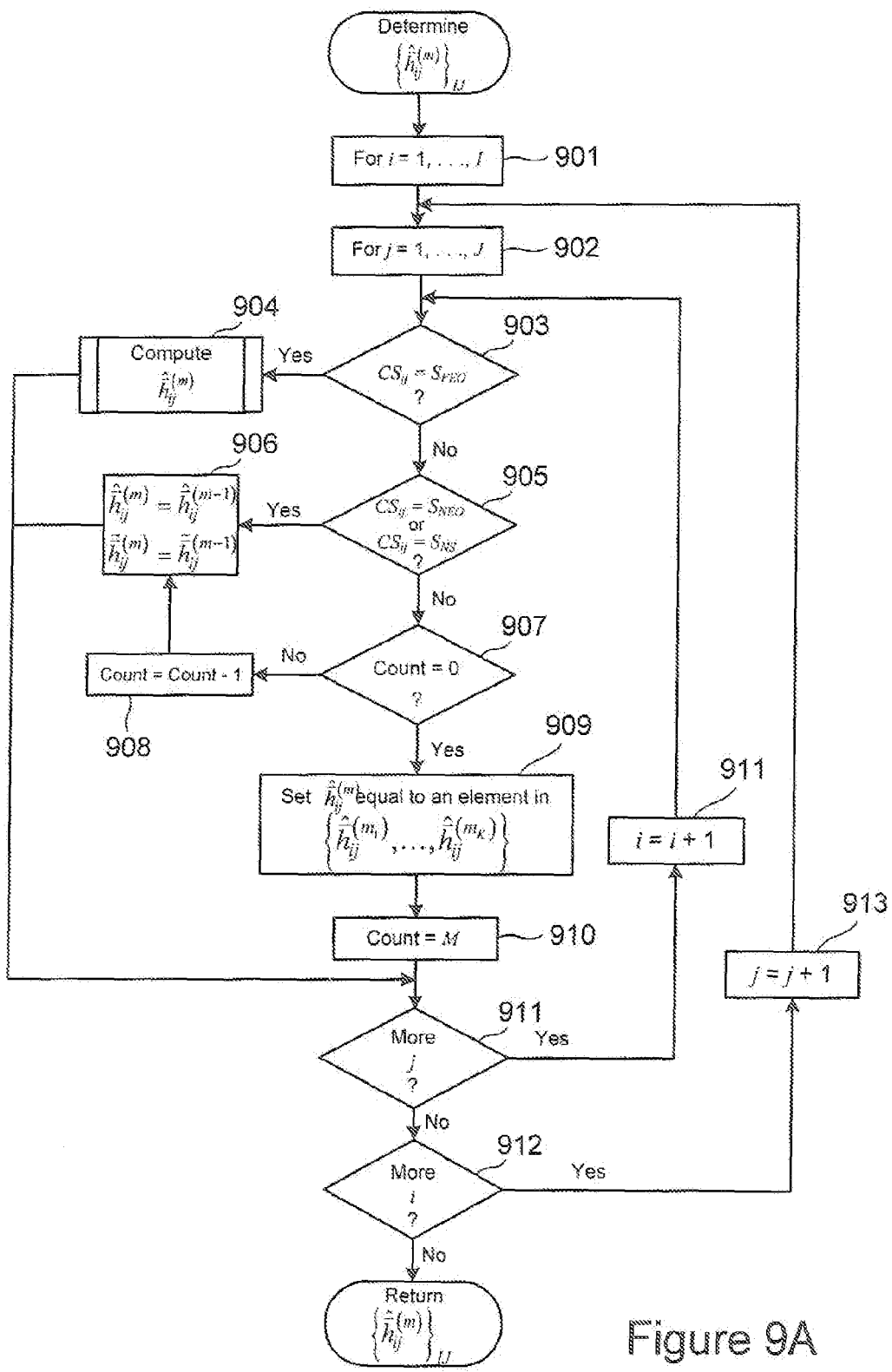
FIG. 9A is a control-flow diagram for the routine "determine $\{\hat{\vec{h}}_{ij}^{(m)}\}_{IJ}$" called in step 615 in FIG. 6 and represents an embodiment of the present invention.

FIG. 9A is a control-flow diagram for the routine "determine $\{\vec{h}_{ij}^{(m)}\}_{I,J}$" called in step 615 in FIG. 6 and represents an embodiment of the present invention. In the for-loop beginning in step 902, steps 902-913 are repeated for each $i \in \{1, \ldots, I\}$. In the for-loop beginning in step 902, steps 903-911 are repeated for each $j \in \{1, \ldots J\}$. In step 903, when the $CS_{ij}$ is $S_{FEO}$, control passes to step 904, otherwise control passes to step 905. In step 904, the routine "compute $\vec{h}_{\wedge ij}^{(m)}$" is called and an approximate-impulse-response vector $\vec{h}_{\wedge ij}^{(m)}$ is computed. In step 905, when the $CS_{ij}$ is $S_{NEO}$ or $S_{NS}$, control passes to step 906, otherwise control passes to step 907. In step 906, the impulse-response vector is updated by assigning elements in the vector $\vec{h}_{\wedge ij}^{(m)}$ to corresponding values in the previous impulse response $\vec{h}_{\wedge ij}^{(m-1)}$, and the shadow-impulse-response vector is updated by assigning elements in the shadow-impulse-response vector $\vec{h}_{ij}^{(m)}$ to corresponding elements in the shadow-impulse-response vector $\vec{h}_{ij}^{(m-1)}$ from the previous decision period, and $$\beta_m^{-1} = \beta_{m-1}^{-1}$$

$$F\widetilde{h}_{ij}^{(m)} = F\widetilde{h}_{ij}^{(m)}$$

$$F\Lambda_{ij(m)}^{-1} = F\Lambda_{ij(m-1)}^{-1}, \text{ and}$$

$$F\Psi_{ij(m)}^{-1} = F\Psi_{ij(m-1)}^{-1}$$

Figure 9B:
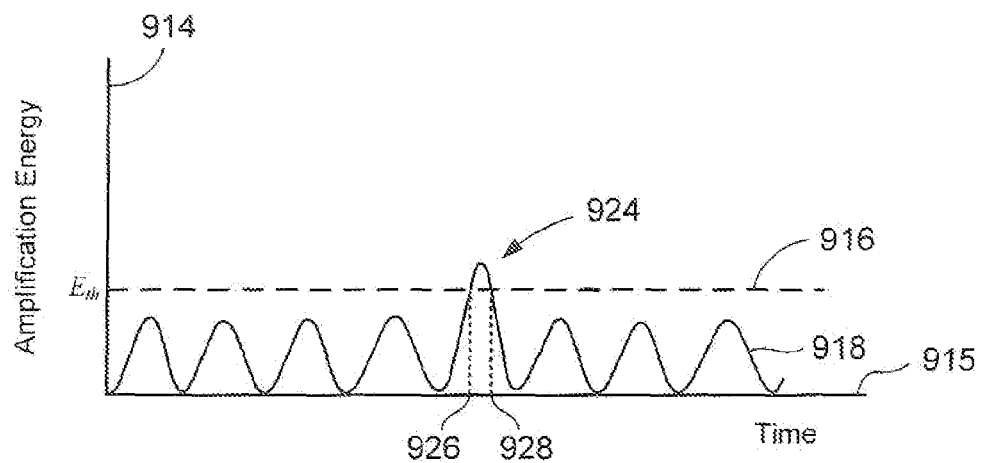
FIGS. 9B-9C shows two plots of amplification energy versus time for the four types of control states that represents an embodiment of the present invention.
Figure 9C:
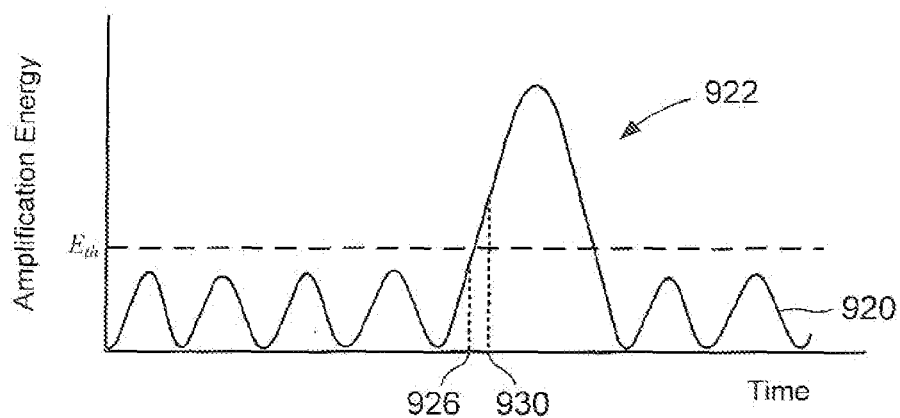

Steps 907, 908, and 909 are used to guard against misinterpreting the presence of double talk as described below with reference to FIGS. 9B-9C. In step 907, when "count" does not equal "0," control passes to step 907, otherwise control passes to step 909. In step 908, the "count" is decremented by "1" and control passes to step 906. In step 909, the approximate-impulse-response vector $\vec{h}_{ij}^{(m)}$ for double talk is selected form an impulse-response data structure represented by a set $\{\vec{h}_{ij}^{(m_1)}, \ldots, \vec{h}_{ij}^{(m_K)}\}$. In step 910, the "count" is assigned the value M. The value M can be 10, 12, 15, 18, or any other suitable value. In step 910, when j is greater than J, control passes to step 912, otherwise control passes to step 911. In step 911, i is incremented by "1" and steps 902-910 are repeated. In step 912, when i is greater than I, the set of approximate impulse response vectors $\{\vec{h}_{ij}^{(m)}\}_{I,J}$ is returned, otherwise control passes to step 913 and j is incremented by "1."

Note that there are I×J impulse-response data structures, one impulse-response data structure for each different echo path. Each data structure includes the K most recent approximate impulse responses with the highest signal to noise ratio. The subscripts on the decision epochs m correspond to the order in which the impulse response vectors have been added to the data structure. For example, in the data structure in step 909, the impulse response vector $\vec{h}_{ij}^{(m_K)}$ has been in the data structure the longest, and the impulse response vector $\vec{h}_{ij}^{(m_1)}$ is the most recent addition to the data structure. Note that the approximate-impulse-response vector is not updated during double talk because during double talk the signal-to-noise ratio decreases rapidly. The increased noise distorts the approximate-impulse-response vector. In order to avoid this distortion, the approximate-impulse-response vector $\vec{h}_{ij}^{(m)}$ is selected from the corresponding impulse-response data structure $\{\vec{h}_{ij}^{(m_1)}, \ldots, \vec{h}_{ij}^{(m_K)}\}$, which can be stored in a computer readable medium for subsequent executions of the method of the present invention. For example, the data structure $\{\vec{h}_{ij}^{(m_1)}, \ldots, \vec{h}_{ij}^{(m_K)}\}$ can be stored on a hard drive and used to provide the initial impulse responses for a subsequent execution of the described implementation. As long the conditions in the near room 102 remain substantially unchanged, such as the same number of tables and chairs remain unchanged, the data structure saved from a previous execution of methods of the present invention can be used to provide the initial values for impulse response in a subsequent execution of these methods. In this way, the model of the near room is achieved more rapidly than when the method is initiated for the first time. In various embodiments of the present invention, the approximate-impulse-response vector can be selected based on any number of different criteria. For example, in one embodiment of the present invention, an approximate-impulse-response vector can be selected in step 909 according to which impulse-response vector has the largest corresponding $ERLE_j^{(m_j)}$. In another embodiment of the present invention, in step 909, the approximate-impulse-response vector can be selected from the corresponding data structure based on which approximate-impulse-response vector has been in the data structure the longest, which is $\vec{h}_{ij}^{(m_K)}$.

In the control-flow diagram of FIG. 9A, the steps 907, 908, and 906 are repeated for M iterations in order avoid misinterpreting noises transmitted in a corresponding echo paths as $S_{DT}$. FIGS. 9B-9C shows two plots of amplification energy versus time for the four types of control states that represents an embodiment of the present invention. In FIGS. 9B-9C, vertical axes, such as vertical axis 914, represent amplification energy associated with signals transmitted between the near room 102 and the far room 104, horizontal axes, such as horizontal axis 915, represent time, and horizontal dashed lines, such as dashed line 916, correspond to a double talk threshold energy, $E_{th}$. Curves 918 and 920 represent the amplification energies associated with signals transmitted between the near room 102 and the far room 104. Amplification energies below the double talk threshold $E_{th}$ correspond to an $S_{FEO}$, $S_{NEO}$, or $S_{NS}$ control state. Peak 922 corresponds to amplification energy resulting from double talk, which exceeds the double talk threshold $E_{th}$. However, peak 924 corresponds to an echo path noise produced in the near room 102 or the far room 104. This noise initially creates the appearance of double talk because the amplification energy exceeds the double talk threshold energy $E_{th}$ even though double talk is not actually taking place. In order to avoid misinterpreting short duration noises as double talk, at time 926, a countdown begins with the variable "count," described with reference to steps 906, 907, and 905, which avoids selecting an approximate-impulse-response vector from the data structure $\{\vec{h}_{ij}^{(m_1)}, \ldots, \vec{h}_{ij}^{(m_K)}\}$ in step 908 until double talk has been confirmed for M iterations. In other words, the method of the present invention continues operating as if double talk has not occurred for M decision periods. If after M iterations the amplification energy has decreased, as indicated at time 928 in FIG. 9B, inappropriate selection of an approximate-impulse-response vector for double talk has been avoided. On the other hand, if after M iterations the amplification energy has increased, as indicated the curve 920 at time 930 in FIG. 9C, an approximate impulse-response for double talk is selected in step 909.

Figure 10:
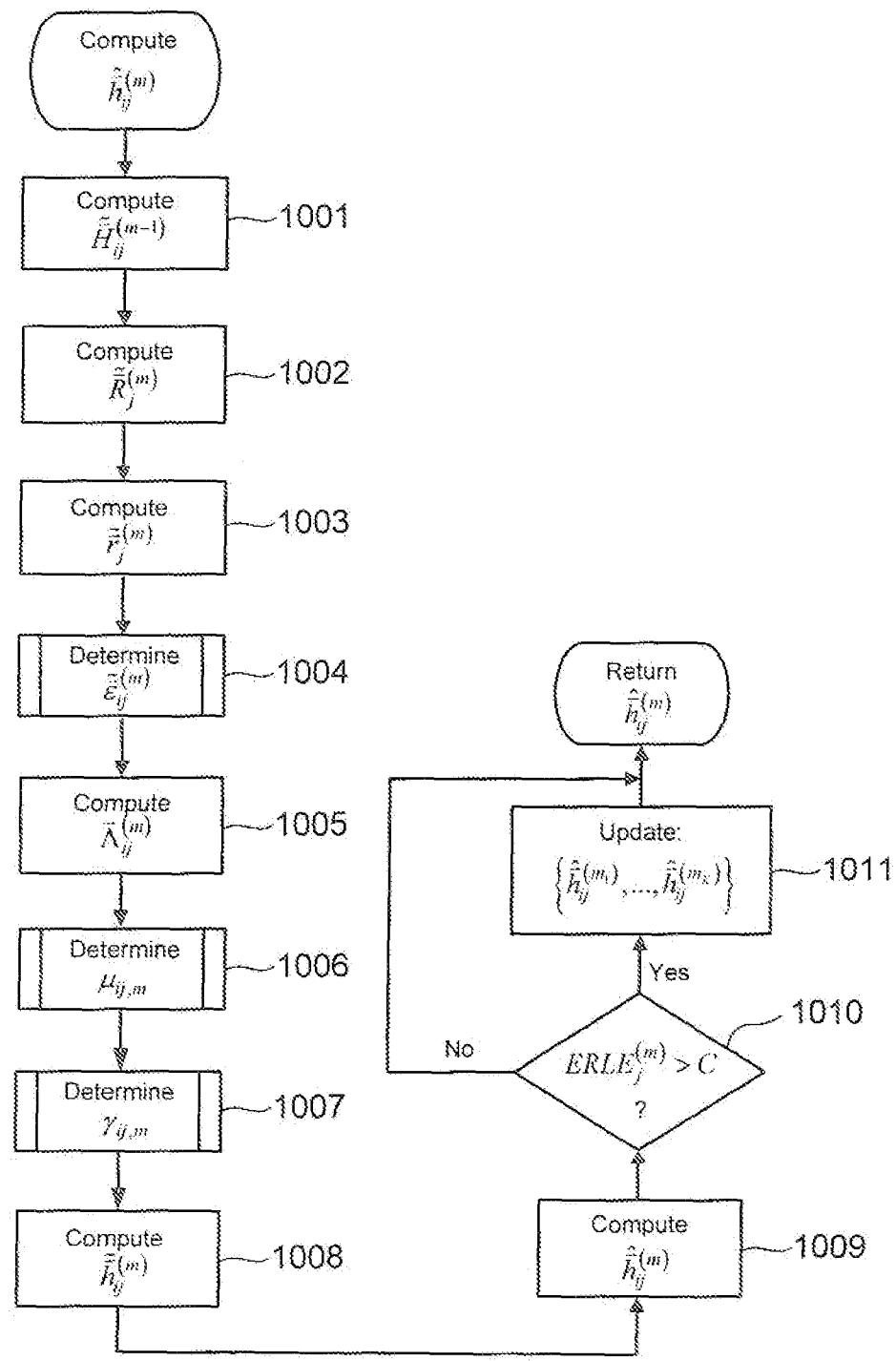
FIG. 10 is a control-flow diagram for the routine "compute $\hat{\vec{h}}_{ij}^{(m)}$" called in step 904 in FIG. 9 and represents an embodiment of the present invention.

The methods now described with reference to FIGS. 10-13 are repeated for each echo path. FIG. 10 is a control-flow diagram for the routine "compute $\vec{h}_{ij}^{(m)}$" called in step 904 in FIG. 9 and represents an embodiment of the present invention. In step 1001, the FFT is applied to the shadow impulse-response vector $\vec{h}_{ij}^{(m-1)}$ in order to obtain a frequency domain dependent vector:

$$\widetilde{\vec{H}}_{ij}^{(m-1)} = \begin{bmatrix} \widetilde{H}_{ij}^{(m-1)}[0] \\ \widetilde{H}_{ij}^{(m-1)}[1] \\ \vdots \\ \widetilde{H}_{ij}^{(m-1)}[N-1] \end{bmatrix} = FFT \left\{ \begin{bmatrix} \widetilde{h}_{ij}^{(m-1)}[n] \\ \widetilde{h}_{ij}^{(m-1)}[n-1] \\ \vdots \\ \widetilde{h}_{ij}^{(m-1)}[n-(L-1)] \end{bmatrix} \right\}$$

In step 1002, a frequency domain, shadow-error vector is computed as follows:

$$\widetilde{\vec{R}}_j^{(m)} = FFT \cdot Tr_P \cdot IFFT \left\{ \overline{Y}_j^{(m)} - \sum_{i=1}^{i} \left( \overline{X}_i^{(m)} \cdot (\widetilde{\vec{H}}_{ij}^{(m-1)})^* \right) \right\}$$

where

Tr$_P$ is a truncation operator of length P, and $$\tilde{R}_j^{(m)} = \begin{bmatrix} \bar{R}_{ij}^{(m-1)}[0] \\ \bar{R}_{ij}^{(m-1)}[1] \\ \vdots \\ \bar{R}_{ij}^{(m-1)}[N-1] \end{bmatrix}$$

In step 1003, an IFFT is applied to the frequency domain, shadow-error vector in order to obtain a shadow-error vector:

$$\vec{\tilde{r}}_j^{(m)} = \text{FFT}\{\tilde{R}_j^{(m)}\}$$

In step 1004, the routine "determine $\vec{\epsilon}_{ij}^{(m)}$" is called to calculate a shadow mismatch vector $\vec{\epsilon}_{ij}^{(m)}$. In step 1005, an evolving trust-region vector is determined in accordance with the following recursive formula:

$$\beta_m^{-1} = \beta_{m-1}^{-1} + 1$$

$$\mathcal{J}\bar{h}_{ij}^{(m)} = (1-\beta_m)\mathcal{J}\bar{h}_{ij}^{(m-1)} + \beta_m \mathcal{J}\hat{h}_{ij}^{(m-1)}$$

$$\mathcal{J}\Psi_{ij(m)}^{-1} = \beta_m^{-1}\left(\mathcal{J}\Psi_{ij(m-1)}^{-1} - \frac{|\mathcal{J}\Psi_{ij(m-1)}^{-1} \cdot \mathcal{J}\bar{h}_{ij}^{(m-1)}|^2}{|\mathcal{J}\bar{h}_{ij}^{(m-1)}|^2 \cdot \mathcal{J}\Psi_{ij(m)}^{-1} - \beta_m}\right)$$

$$F\Lambda_{ij(m)}^{-1} = F\Lambda_{ij(m-1)}^{-1} - \frac{|F\Psi_{ij(m-1)}^{-1} \cdot F\hat{h}_{ij}^{(m-1)}|^2}{1 + |F\hat{h}_{ij}^{(m-1)}|^2 \Box F\Psi_{ij(m-1)}^{-1}}$$

The trust-region vector $$\vec{\Lambda}_{ij}^{(m)} = F^{-1}\{F\Lambda_{ij(m)}^{-1}\}$$

is used to compute the shadow update step size $\mu_{ij,m}$ in the routine "determine $\mu_{ij,m}$" called in step 1006. The trust-region vector $\vec{\Lambda}_{ij}^{(m)}$ is also used to compute and the adaptation step size $\gamma_{ij,m}$ in the routine "determine $\gamma_{ij,m}$" called in step 1007. In step 1008, the shadow mismatch vector $\vec{\epsilon}_{ij}^{(m)}$, determined in step 1004, and the shadow update step size $\mu_{ij,m}$, determined in step 1006, are used to recursively compute a shadow-impulse-response vector:

$$\vec{\tilde{h}}_{ij}^{(m)} = \vec{\tilde{h}}_{ij}^{(m-1)} + \mu_{ij,m} \vec{\epsilon}_{ij}^{(m)}$$

In step 1009, the adaptation step size $\gamma_{ij,m}$, determined in step 1007, is used to recursively compute the approximate-impulse-response vector as follows:

$$\vec{\hat{h}}_{ij}^{(m)} = (1-\gamma_{ij,m})\vec{\hat{h}}_{ij}^{(m-1)} + \gamma_{ij,m}\vec{\tilde{h}}_{ij}^{(m)}$$

The parameter $\gamma_{ij,m}$ is used to weighting factor. In step 1010, when the $\text{ERLE}_j^{(m)}$ is greater than a threshold value C, control passes to step 1011. The threshold value C can be 10, 12, 15, or any other suitable value for weighting the approximate-impulse-response vector $\vec{\hat{h}}_{ij}^{(m)}$. In step 1011, the impulse-response data structure described above with reference to step 909, in FIG. 9A:

$$\{\vec{\hat{h}}_{ij}^{(m1)}, \vec{hh}_{ij}^{(m2)}, \ldots, \vec{\hat{h}}_{ij}^{(mK-1)}, \vec{\hat{h}}_{ij}^{(mK)}\}$$

is stored and updated.

The impulse-response vectors are arranged in the impulse-response data structure in order of increasing decision epoch values as follows $m_1 > m_2 > \ldots > m_{K-1} > m_K$, where the decision epoch $m_K$ corresponds to an approximate-impulse-response vector that has been in the data structure for the longest period of time, and the decision epoch $m_1$ corresponds to the most recent approximate-impulse-response vector added to the data structure. In one embodiment of the present invention, the data structure can be updated in step 1011 by removing the impulse-response vector $\vec{\hat{h}}_{ij}^{(mK)}$ from the data structure and adding the most recently computed impulse-response vector $\vec{\hat{h}}_{ij}^{(m)}$ to the data structure computed in step 1009, which gives the impulse response data structure:

$$\{\vec{\hat{h}}_{ij}^{(m)}, \vec{\hat{h}}_{ij}^{(m1)}, \ldots, \vec{\hat{h}}_{ij}^{(mK-2)}, \vec{\hat{h}}_{ij}^{(mK-1)}\}$$

In other embodiments of the present invention, the data structure can be updated in step 1011 according to the magnitude of the ERLE values associated with each approximate-impulse-response vector. For example, the approximate-impulse-response vector with the smallest associated ERLE value is removed from the data structure in order to accommodate addition of the most recently computed approximate-impulse-response vector computed in step 1009 and have an ERLE satisfying the threshold condition in steps 1010.

The shadow update step size $\mu_{ij,m}$ determined by the routine "determine $\mu_{ij,m}$" called in the step 1006 substantially ensures that the shadow-impulse-response vector $\vec{\tilde{h}}_{ij}^{(m)}$ determined in the step 1008 lies within an evolving "trust region" that lies within a model $\mathcal{M}$. For every shadow-impulse-response vector $\vec{\tilde{h}}_{ij}^{(m)}$ there is a separate trust region that lies within the model $\mathcal{M}$. The trust region can be have many different hyper-dimensional shapes, such as a hyper-spherical region, a hyper-elliptical region, a hyper-cubic region, or any other hyper-dimension region that lies within the model $\mathcal{M}$.

The impulse-response space is assumed to be a hyper-dimensional region that lies within the model $\mathcal{M}$. For example, returning to FIG. 6B, the size, eccentricity, orientation, and dimensionality of the hyper-dimensional elliptical regions regions 622, 624, and 626 are determined by the vector $\vec{\Lambda}_{ij}^{(m-1)}$ computed in step 1005. The hyper-dimensional impulse response regions are said to "evolving" because when a subsequent vector $\vec{\Lambda}_{ij}^{(m)}$ is determined, the associated region changes shape, eccentricity, orientation and experiences a reduced dimensionality within the impulse response search space. A newly computed shadow-impulse-response vector $\vec{\tilde{h}}_{ij}^{(m)}$ computed according to the recursive formula:

$$\vec{\tilde{h}}_{ij}^{(m)} = \vec{\tilde{h}}_{ij}^{(m-1)} + \mu_{ij,m} \vec{\epsilon}_{ij}^{(m)}$$

falls within a newly oriented lower dimensional hyper-dimensional region of the impulse response space.

Note that in other embodiments of the present invention, rather than computing a single shadow update step size $\mu_{ij,m}$ to update the shadow impulse-response vector, the magnitude of the shadow impulse-response vector can be changed to lie within the trust region by computing a second vector that is added to the shadow impulse-response vector $\vec{\tilde{h}}_{ij}^{(m)}$ so that the resulting shadow impulse-response vector lies within the trust region.

Figure 11:
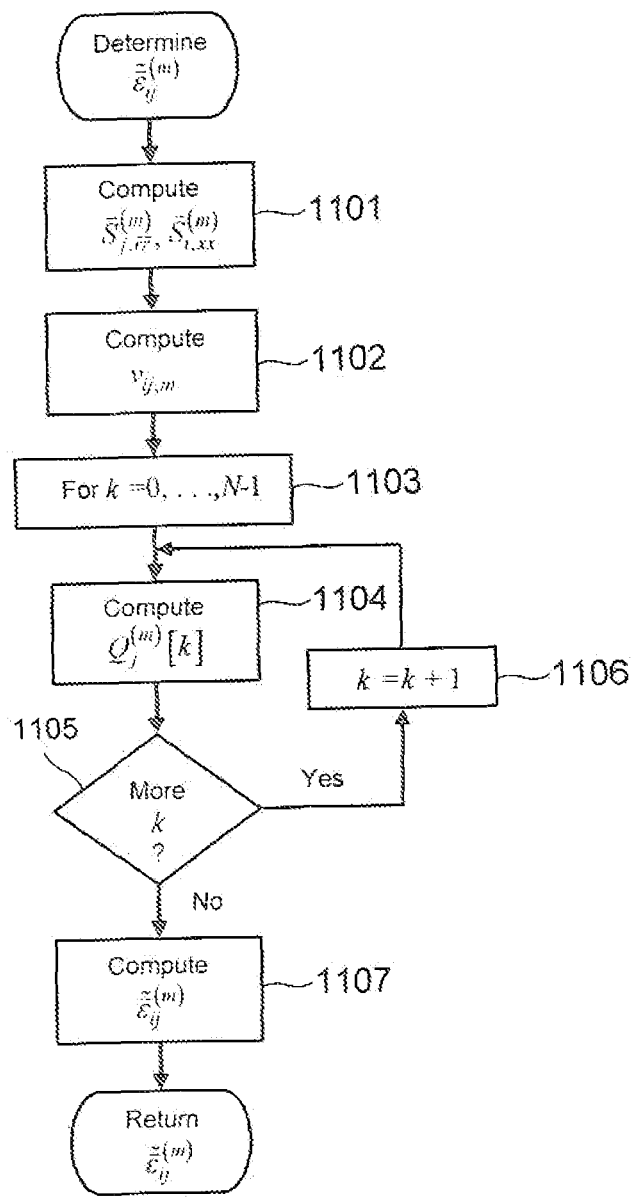
FIG. 11 is a control-flow diagram for the routine "determine $\vec{\epsilon}_{ij}^{(m)}$" called in step 1004 in FIG. 10 and represents an embodiment of the present invention.

FIG. 11 is a control-flow diagram for the routine "determine $\vec{\epsilon}_{ij}^{(m)}$" called in step 1004 in FIG. 10 and represents an embodiment of the present invention. In step 1101, an average spectrum of the frequency domain vector $\vec{X}_j^{(m)}$ is computed as follows:

$$\vec{S}_{i,xx}^{(m)} = (1-\beta)\vec{S}_{i,xx}^{(m-1)} + \beta \vec{X}_i^{(m)} \circ \vec{X}_i^{(m)}$$

and an average spectrum of the frequency domain shadow-error vector $\vec{\tilde{R}}_j^{(m)}$ is computed as follows:

$$\vec{\tilde{S}}_{j,\tilde{r}\tilde{r}}^{(m)} = (1-\beta)\vec{\tilde{S}}_{j,\tilde{r}\tilde{r}}^{(m-1)} + \beta \vec{\tilde{R}}_j^{(m)} \circ \vec{\tilde{R}}_j^{(m)}$$

where $$\overline{S}_{i,xx}^{(m)} = \begin{bmatrix} S_{i,xx}^{(m)}[0] \\ S_{i,xx}^{(m)}[1] \\ \vdots \\ S_{i,xx}^{(m)}[N-1] \end{bmatrix}, \text{ and } \overline{S}_{j,rr}^{(m)} = \begin{bmatrix} S_{j,rr}^{(m)}[0] \\ S_{j,rr}^{(m)}[1] \\ \vdots \\ S_{j,rr}^{(m)}[N-1] \end{bmatrix}$$

The parameter $\beta$ is a weighting factor. In step 1102, the maximum energies computed in FIG. 7 are used to determine:

$$v_m = \frac{\sum_{i=1}^{I} M_{i,x}^{2(m)}}{\sum_{j=1}^{J} M_{i,y}^{2(m)}}$$

In steps 1103-1106, elements of an N-component, frequency domain, preconditioning vector $\tilde{Q}_j^{(m)}$ are determined. In the for-loop beginning in step 1103, steps 1104-1106 are repeated for each frequency domain index k. In step 1104, the elements of the preconditioning vector $\vec{Q}_j^{(m)}$ are calculated as follows:

$$Q_j^{(m)}[k] = \frac{1}{\sum_{i=1}^{I} S_{i,xx}^{(m)}[k] + v_m S_{j,\tilde{r}\tilde{r}}^{(m)}[k] + \lambda F \Psi_{ij(m)}^{-1}[k]}$$

where k ranges from 0 to N–1. In step 1105, when k is less than N–1, control passes to step 1106, otherwise control passes to step 1107. In step 1106, the index k is incremented by the value "1." In step 1107, the vector $\vec{\epsilon}_{ij}^{(m)}$ is computed as follows:

$$\vec{\epsilon}_{ij}^{(m)} = Tr_L \cdot IFFT\{\vec{Q}_j^{(m)} \circ \vec{X}_i^{(m)} \circ (\vec{\tilde{R}}_j^{(m)})^*\}$$

where
Tr$_L$ is a truncation operator of size L, and $$\vec{\tilde{\epsilon}}_{ij}^{(m)} = \begin{bmatrix} \overline{\epsilon}_{ij}[0] \\ \overline{\epsilon}_{ij}[1] \\ \vdots \\ \overline{\epsilon}_{ij}[L-1] \end{bmatrix}$$

Figure 12:
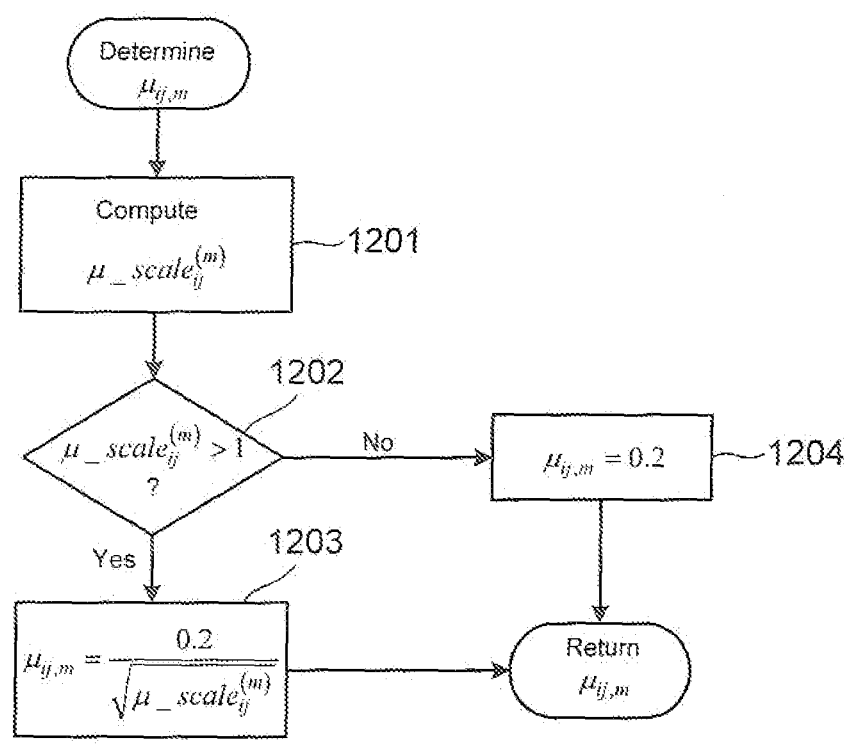
FIG. 12 is a control-flow diagram for the routine "determine $\mu_{ij,m}$" called in step 1006 in FIG. 10 that represents an embodiment of the present invention.

FIG. 12 is a control-flow diagram for the routine "determine $\mu_{ij,m}$" called in step 1006 in FIG. 10 that represents an embodiment of the present invention. In step 1201, a parameter $\mu\_scale_{ij}^{(m)}$ is computed as follows:

$$\mu\_scale_{ij}^{(m)} = \sum_{n=0}^{L-1} \Lambda_{ij}^{(m)}[n](\overline{\epsilon}_{ij}^{(m)}[n])^2$$

In step 1202, when $\mu\_scale_{ij}^{(m)}$ is greater than the value "1," control passes to step 1203, otherwise control passes to step 1204. In step 1203, $\mu_{ij,m}$ is assigned the value $0.2/\sqrt{\mu\_scale_{ij}^{(m)}}$. In step 1204, $\mu_{ij,m}$ is assigned the value "0.2."

Figure 13:
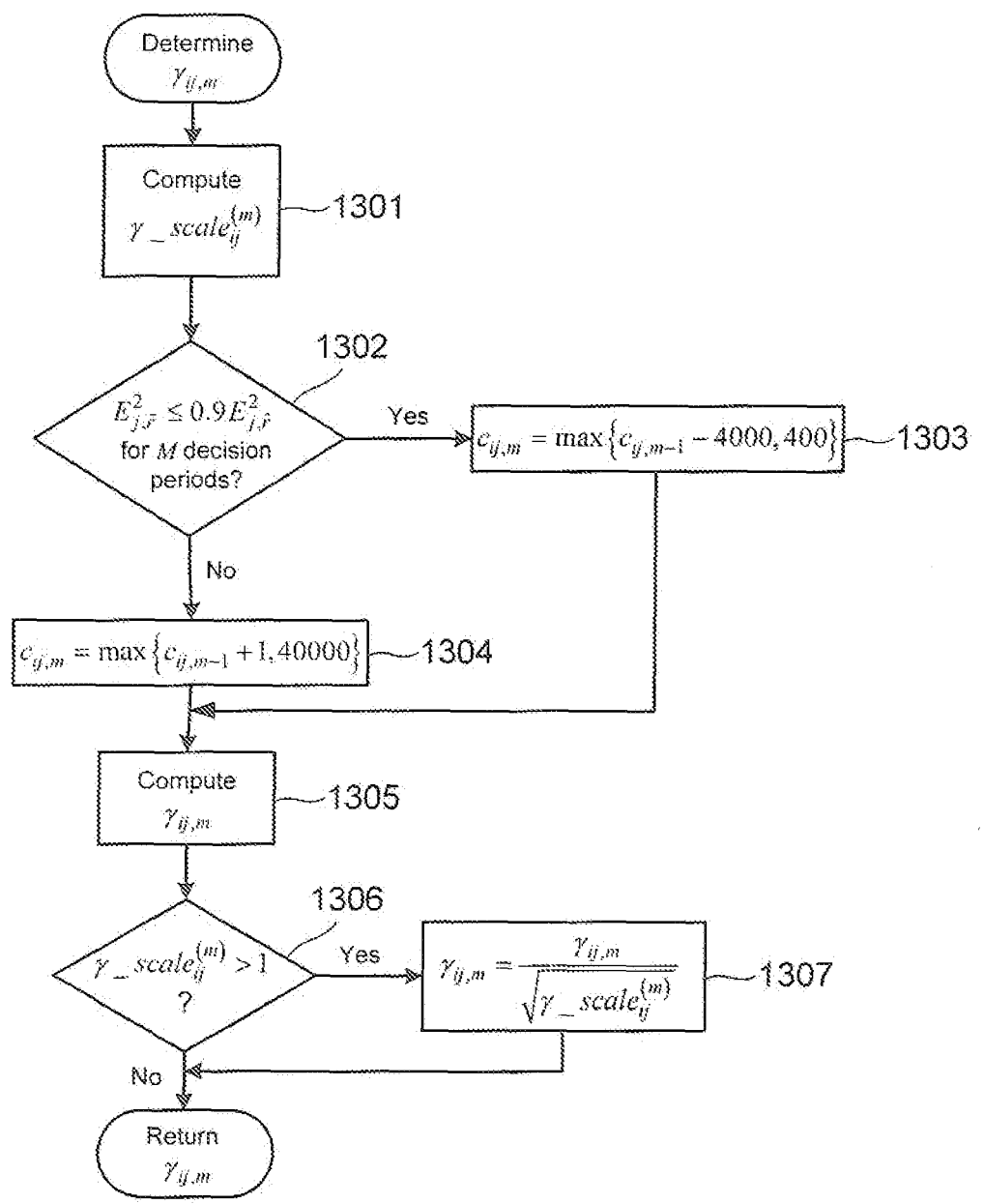
FIG. 13 is a control-flow diagram for the routine "determine $\gamma_{ij,m}$" called in step 1007 in FIG. 10 that represents an embodiment of the present invention.

FIG. 13 is a control-flow diagram for the routine "determine $\gamma_{ij,m}$" called in step 1007 in FIG. 10 that represents an embodiment of the present invention. In step 1301, a parameter $\gamma\_scale_{ij}^{(m)}$ is computed as follows:

$$\gamma\_scale_{ij}^{(m)} = \frac{1}{L}\sum_{n=0}^{L-1} \Lambda_{ij}^{(m)}[n](\overline{h}_{ij}^{(m)}[n])^2$$

In step 1302, when $E_{j,\tilde{r}}^2 \leq 0.9 E_{j,\tilde{r}}^2$ and after M time samples, control passes to step 1303, otherwise, control passes to step 1304. In step 1303, a parameter $c_{ij,m}$ is computed recursively as follows:

$$c_{ij,m} = \max\{c_{ij,m-1} - 4000, 400\}$$

In step 1304, the parameter $c_{ij,m}$ is computed recursively as follows:

$$c_{ij,m} = \max\{c_{ij,m-1} + 1, 40000\}$$

In step 1305, $\gamma_{ij,m}$ is assigned a value according to:

$$\gamma_{ij,m} = 5\left(\frac{v_{ij,m}}{v_{ij,m} + c_{ij,m}}\right)^{.85}$$

where $v_{ij,m}$ is computed in step 1102 of FIG. 11. In step 1306, when $\gamma\_scale_{ij}^{(m)}$ is greater than "1," control passes to step 1307. In step 1307, $\gamma_{ij,m}$ is assigned the value:

$$\gamma_{ij,m} = \frac{\gamma_{ij,m}}{\sqrt{\gamma\_scale_{ij}^{(m)}}}$$

Although the present invention has been described with respect to one embodiment, methods of the present invention are not limited to this embodiment. For example, in other embodiments of the present invention, acoustic echo cancellation may only be applied to a portion of the microphone digital signals. In particular, acoustic echo cancellation methods of the present invention may be applied to only those microphone-digital signals with amplitudes greater than some predetermined threshold rather than applying the method to all of the microphone-digital signals.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for reducing acoustic echoes in a plurality of microphone-digital signals transmitted from a far room to a near room using a computing device, the method comprising:
   calculating a plurality of approximate impulse responses using the computer device, each approximate impulse response associated with an echo path between a loudspeaker and a microphone in the near room, wherein the plurality of impulse responses lies within a model of the space of possible impulse responses, wherein said model comprises a hyper-dimensional ellipsoid that lies within an impulse response space, the model evolving over time such that an eccentricity of the ellipsoid increases and a size of the ellipsoid decreases to provide a more limited space from which to select subsequent approximate impulse responses;
   convolving the plurality of approximate impulse responses with digital signals generated in the far room to produce approximate acoustic echoes using the computing device;
   subtracting the plurality of approximate acoustic echoes from microphone-digital signals generated in the near room and sent to the far room using the computing device; and
   preserving audio quality without uncorrelating the digital signals from the far room after the approximate impulse responses and approximate acoustic echoes of the far room are determined.

2. The method of claim 1 wherein the plurality of approximate impulse responses are stored in a computer readable medium and used to provide initial impulse responses for a subsequent execution of the method described in claim 1.

3. The method of claim 1 wherein a direction of skewness of the ellipsoid of the model is associated with principle components of the approximate impulse responses as the ellipsoid evolves into a more limited space from which to select subsequent approximate impulse responses, and wherein the method further comprises assigning a relatively higher priority to a direction of said principle components and a relatively lower priority to other directions as the ellipsoid evolves in time reducing a dimensionality of the impulse response space.

4. The method of claim 1 wherein calculating a plurality of approximate impulse responses further comprises identifying a type of audio transmission associated with each echo path as one of the following:
   audio signals produced at the near room only;
   audio signals produced at the far room only;
   audio signals simultaneously produced at in the near room and the far room; and
   no audio signals produced at either the near room or the far room.

5. The method of claim 4 wherein when no audio signals are simultaneously produced between the near room and the far room, approximate impulse response $\hat{h}^{(m)}$ is computed by a computing device by minimizing:

$$f^{(m)}(\hat{h}^{(m)}) = \sum_{n=(m-q)N_d+1}^{mN_d} |y[n] - \hat{h}^{(m)T}\vec{x}[n]|^2$$

with respect to $\hat{h}^{(m)}$, where $\vec{x}[n]^T = [x_1[n], \ldots, x_1[n-L+1], \ldots, x_J[n], \ldots, x_J[n-L+1]]$ $\vec{x}[n]$ represents digital signal generated in the far room;
y[n] represents a digital microphone signal generated in the near room;
J represents the number of microphone located in the near room;
L is the effective size of the echo paths;
q denotes the amount of overlap size in blocks;
$N_d$ denotes the number of time samples; and
$\hat{h}^{(m)}$ represents a concatenation of approximate impulse response vectors.

6. The method of claim 4 wherein when the computing determines that the near room does not experience a change in conditions, $\hat{h}^{(m-1)}$ is not qualified and the computing device sets for the next decision epoch m as follows:

$$\beta_m^{-1} = \beta_{m-1}^{-1}$$

$$F\bar{h}^{(m)} = F\bar{h}^{(m-1)}$$

$$F\Lambda_{(m)}^{-1} = F\Lambda_{(m-1)}^{-1}$$

$$F\Psi_{(m)}^{-1} = F\Psi_{(m-1)}^{-1}$$

where "F" means Fourier transform;
$F\Lambda_{(m)}^{-1}$ and $F\Psi_{(m)}^{-1}$ are vectors comprising the Fourier transform of the singular values of the matrices $\Lambda_{(m)}^{-1}$ and $\Psi_{(m)}^{-1}$, respectively;
$\beta_m^{-1}$ is an integer weighting factor; and $$\bar{h} = \frac{1}{|\Theta|}\sum_\theta h_\theta$$

with $h_\theta$ is a concatenation of possible impulse responses in the near room.

7. The method of claim 4 wherein when the computing determines the near room experiences a change in conditions, $\hat{h}^{(m-1)}$ is qualified and the parameters are adjusted by the computing device to account for changing conditions in the room as follows:

$$\beta_m^{-1} = \beta_{m-1}^{-1} + 1$$

$$F\bar{h}^{(m)} = (1-\beta_m)F\bar{h}^{(m-1)} + \beta_m F\hat{h}^{(m-1)}$$

$$F\Lambda_{(m)}^{-1} = F\Lambda_{(m-1)}^{-1} - \frac{|F\Psi_{m-1}^{-1} \cdot F\hat{h}^{(m-1)}|^2}{1 + |F\hat{h}^{(m-1)}|^2 \, \Box F\Psi_{m-1}^{-1}}$$

$$F\Psi_{(m)}^{-1} = \beta_m^{-1}\left(F\Psi_{(m-1)}^{-1} - \frac{|F\Psi_{(m-1)}^{-1} \cdot F\hat{h}^{(m-1)}|^2}{|F\hat{h}^{(m-1)}|^2 \, \Box F\Psi_{(m)}^{-1} - \beta_m}\right)$$

where "F" means Fourier transform;
$F\Lambda_{(m)}^{-1}$ and $F\Psi_{(m)}^{-1}$ are vectors comprising the Fourier transform of the singular values of the matrices $\Lambda_{(m)}^{-1}$ and $\Psi_{(m)}^{-1}$), respectively;
"∘" means element-wise product of two vectors;
"·" means scalar product of two vectors;
"|\|^2" means element-wise square magnitude of a vector;
$\beta_m^{-1}$ is an integer weighting factor; and $$\bar{h} = \frac{1}{|\Theta|}\sum_\theta h_\theta$$

with $h_\theta$ is a concatenation of possible impulse responses in the near room.

8. The method of claim 1 wherein subtracting the plurality of approximate acoustic echoes from microphone-digital signals the microphone-digital signals further comprises determining a controlled digital signal as follows:

$$\hat{r}_j^{(m)}[n] = Tr_{N_d} \cdot IFFT\left\{\vec{Y}_j^{(m)} - \sum_{i=1}^{I} \vec{X}_i^{(m)} \cdot (\hat{\vec{H}}_{ij}^{(m-1)})^*\right\}$$

where
$j \in \{1, \ldots J\}$ is a microphone index,
$i \in \{1, \ldots, I\}$ is a loudspeaker index,
$Tr_{N_d}$ is a truncation operator of a decision period length $N_d$,
IFFT is inverse Fast-Fourier transform,
"∘" represents component-wise multiplication of two vectors,
$\vec{Y}_j^{(m)}$ is a frequency domain microphone-digital signal,
$\vec{X}_i^{(m)}$ is a frequency domain digital signal,
$\vec{H}_{ij}^{(m-1)}$ is a frequency domain, approximate-impulse-response vector $\vec{h}_{ij}^{(m-1)}$, and $$\sum_{i=1}^{I} \vec{X}_i^{(m)} \cdot (\hat{\vec{H}}_{ij}^{(m-1)})^*$$

is frequency domain, approximate acoustic echo.

9. The method of claim 5 wherein determining the frequency domain, approximate-impulse-response vector further comprises computing $$\hat{\vec{H}}_{ij}^{(m)} = FFT\{\hat{\vec{h}}_{ij}^{(m)}\}$$

where FFT is the Fast-Fourier transform, and
$\vec{h}_{ij}^{(m)}$ is an approximate impulse response vector corresponding to an echo path between an ith microphone and a jth loudspeaker.

10. The method of claim 9 wherein computing the approximate-impulse-response vector $\vec{h}_{ij}^{(m)}$ depending on the type of audio transmission further comprises, when no signals are transmitted between the first location and the second location or when signals are transmitted from first location to the second location, assigning:

$$\hat{\vec{h}}_{ij}^{(m)} = \hat{\vec{h}}_{ij}^{(m-1)}$$

where $\hat{\vec{h}}_{ij}^{(m-1)}$ is an approximate-impulse-response vector associated with a previous decision period identified by m−1.

11. The method of claim 9 wherein computing the approximate-impulse-response vector depending on the type of audio transmission further comprises, when signals are simultaneously transmitted between the first location and the second location, selecting the approximate-impulse-response vector $\vec{h}_{ij}^{(m)}$ from an impulse-response data structure with the K most recent approximate impulse responses with the highest signal to noise ratio $\{\vec{h}_{ij}^{(m_1)}, \ldots, \vec{h}_{ij}^{(m_K)}\}$.

12. The method of claim 11 wherein selecting the approximate-impulse-response vector $\vec{h}_{ij}^{(m)}$ from the impulse response data structure further comprises selecting the approximate impulse-response based on one of:
which impulse-response vector has the largest corresponding echo return loss enhancement value; and
which approximate-impulse-response vector has been in the data structure the longest.

13. The method of claim 9 wherein computing the approximate-impulse-response vector further comprises when signals are transmitted from second location to the first location only employing a recursive formula given by:

$$\hat{\vec{h}}_{ij}^{(m)} = (1 - \gamma_{ij,m})\hat{\vec{h}}_{ij}^{(m-1)} + \gamma_{ij,m}\tilde{\vec{h}}_{ij}^{(m)}$$

where $\tilde{\vec{h}}^{(m)}$ is a shadow-impulse-response vector associated with a decision period identified by m,
$\hat{\vec{h}}_{ij}^{(m-1)}$ is an approximate-impulse-response vector associated with a previous decision period identified by m−1, and
$\gamma_{ij,m}$ is an impulse response step size.

14. A system for reducing acoustic echoes in a plurality of microphone-digital signals transmitted from a near room to a far room, wherein the near room includes a plurality of loudspeakers and a plurality of microphones, the system comprising:
a computer system includes a computer processor that executes a computer program that
calculates a plurality of approximate impulse responses, each approximate impulse response associated with an echo path between a loudspeaker and a microphone in the near room, wherein the plurality of impulse responses lies within a model of the space of possible impulse responses such that over time the model evolves into a more accurate space from which to select subsequent approximate impulse responses;
convolves the plurality of approximate impulse responses with digital signals generated in the far room to produce approximate acoustic echoes;
subtracts the plurality of approximate acoustic echoes from microphone-digital signals generated in the near room and sent to the far room; and
preserves audio quality without uncorrelating the digital signals from the far room after the approximate impulse responses and approximate acoustic echoes of the far room are determined.

15. The system of claim 14 wherein the plurality of approximate impulse responses are stored in a computer readable medium and used to provide initial impulse responses for a subsequent execution of the method described in claim 1.

16. The system of claim 14 calculates a plurality of approximate impulse responses further comprises:
determines whether audio signals are produced at the first location only;
determines whether audio signals are produced at the second location only;
determines whether audio signals are simultaneously produced at the first location and the second location; and
determines whether no audio signals are produced at either the first location or the second location.

17. The system of claim 16 further comprises when no audio signals are simultaneously produced between the near room and the far room, approximate impulse response $\hat{h}^{(m)}$ is computed by a computer system by minimizing:

$$f^{(m)}(\hat{h}^{(m)}) = \sum_{n=(m-q)N_d+1}^{mN_d} \left|y[n] - \hat{h}^{(m)T}\vec{x}[n]\right|^2$$

with respect to $\hat{h}^{(m)}$, where $$\vec{x}[n]^T = [x_1[n], \ldots, x_1[n-L+1], \ldots, x_J[n], \ldots, x_J[n-L+1]]$$

$\vec{x}[n]$ represents the digital signals generated in the far room;

y[n] represents a digital microphone signal generated in the near room;

J represents the number of microphone located in the near room;

L is the effective size of the echo paths;

q denotes the amount of overlap size in blocks;

$N_d$ denotes the number of time samples; and $\hat{h}^{(m)}$ represents a concatenation of approximate impulse response vectors.

18. The system of claim 16 further comprises when the computing determines that the near room does not experience a change in conditions, $\hat{h}^{(m-1)}$ is not qualified and the computer system sets for the next decision epoch m as follows:

$$\beta_m^{-1} = \beta_{m-1}^{-1}$$

$$F\overline{h}^{(m)} = F\overline{h}^{(m-1)}$$

$$F\Lambda_{(m)}^{-1} = F\Lambda_{(m-1)}^{-1}$$

$$F\Psi_{(m)}^{-1} = F\Psi_{(m-1)}^{-1}$$

where "F" means Fourier transform, $F\Psi_{(m)}^{-1}$ and $F\Lambda_{(m)}^{-1}$ are vectors representing the diagonal elements of $\Psi_{(m)}^{-1}$ and $\Lambda_{(m)}^{-1}$, respectively;

$\beta_m^{-1}$ is an integer weighting factor;

$$\overline{h} = \frac{1}{|\Theta|} \sum_\theta h_\theta$$

with $h_\theta$ is a concatenation of possible impulse responses in the near room.

19. The system of claim 16 further comprises when the computing determines the near room experiences a change in conditions, $\hat{h}^{(m-1)}$ is qualified and the parameters are adjusted by the computer system to account for changing conditions in the room as follows:

$$\beta_m^{-1} = \beta_{m-1}^{-1} + 1$$

$$F\overline{h}^{(m)} = (1-\beta_m) F\overline{h}^{(m-1)} + \beta_m F\hat{h}^{(m-1)}$$

$$F\Lambda_{(m)}^{-1} = F\Lambda_{(m-1)}^{-1} - \frac{|F\Psi_{m-1}^{-1} \cdot F\hat{h}^{(m-1)}|^2}{1 + |F\hat{h}^{(m-1)}|^2 \cdot F\Psi_{m-1}^{-1}}$$

-continued $$F\Psi_{(m)}^{-1} = \beta_m^{-1} \left( F\Psi_{(m-1)}^{-1} - \frac{|F\Psi_{(m-1)}^{-1} \cdot F\overline{h}^{(m-1)}|^2}{|F\overline{h}^{(m-1)}|^2 \cdot F\Psi_{(m)}^{-1} - \beta_m} \right)$$

where

"F" means Fourier transform, $F\Psi_{(m)}^{-1}$ and $F\Lambda_{(m)}^{-1}$ are vectors representing the diagonal elements of $\Psi_{(m)}^{-1}$ and $\Lambda_{(m)}^{-1}$, respectively;

"∘" means element-wise product of two vectors;

"·" means scalar product of two vectors;

"$|\cdot|^2$" means element-wise square magnitude of a vector;

$\beta_m^{-1}$ is an integer weighting factor; and $$\overline{h} = \frac{1}{|\Theta|} \sum_\theta h_\theta$$

with $h_\theta$ is a concatenation of possible impulse responses in the near room.

20. The system of claim 14 wherein subtracts the plurality of approximate acoustic echoes from microphone-digital signals further comprises computes a controlled digital signal as follows:

$$\hat{r}_j^{(m)}[n] = Tr_{N_d} \cdot IFFT \left\{ \overline{Y}_j^{(m)} - \sum_{i=1}^{I} \overline{X}_i^{(m)} \cdot (\hat{H}_{ij}^{(m-1)})^* \right\}$$

where j∈{1, . . . J} is a microphone index, i∈{1, . . . , I} is a loudspeaker index, $Tr_{N_d}$ is a truncation operator of a decision period length $N_d$, IFFT is inverse Fast-Fourier transform, "∘" represents component-wise multiplication of two vectors, $\vec{Y}_j^{(m)}$ is a frequency domain microphone-digital signal, $\vec{X}_i^{(m)}$ is a frequency domain digital signal, $\vec{H}_{ij}^{(m-1)}$ is a frequency domain, approximate-impulse-response vector, and $$\sum_{i=1}^{I} \overline{X}_i^{(m)} \circ (\hat{\overline{H}}_{ij}^{(m-1)})^*$$

is frequency domain, approximate acoustic echo.

\* \* \* \* \*

UNITED STATES PATENT AND TRADEMARK OFFICE
CERTIFICATE OF CORRECTION

PATENT NO. : 8,483,398 B2  
APPLICATION NO. : 12/387351  
DATED : July 9, 2013  
INVENTOR(S) : Majid Fozunbal et al.

Page 1 of 2

It is certified that error appears in the above-identified patent and that said Letters Patent is hereby corrected as shown below:

In the Claims

In column 28, lines 44-46, in Claim 7, delete "$F\Lambda^{-1}_{(m)} = F\Lambda^{-1}_{(m-1)} - \frac{|F\Psi^{-1}_{m-1} \cdot F\hat{h}^{(m-1)}|^2}{1 + |F\hat{h}^{(m-1)}|^2 \Box F\Psi^{-1}_{m-1}}$ " and insert -- $F\Lambda^{-1}_{(m)} = F\Lambda^{-1}_{(m-1)} - \frac{|F\Psi^{-1}_{m-1} \cdot F\hat{h}^{(m-1)}|^2}{1 + |F\hat{h}^{(m-1)}|^2 - F\Psi^{-1}_{m-1}}$ --, therefor.

In column 28, lines 47-50, in Claim 7, delete "$F\Psi^{-1}_{(m)} = \beta_m^{-1}\left(F\Psi^{-1}_{(m-1)} - \frac{|F\Psi^{-1}_{(m-1)} \cdot F\hat{h}^{(m-1)}|^2}{|F\hat{h}^{(m-1)}|^2 \Box F\Psi^{-1}_{(m)} - \beta_m}\right)$ " and insert -- $F\Psi^{-1}_{(m)} = \beta_m^{-1}\left(F\Psi^{-1}_{(m-1)} - \frac{|F\Psi^{-1}_{(m-1)} \cdot F\hat{h}^{(m-1)}|^2}{|F\hat{h}^{(m-1)}|^2 - F\Psi^{-1}_{(m)} - \beta_m}\right)$ --, therefor.

In column 28, line 55, in Claim 7, delete " $\Psi_{(m)}^{-1})$," and insert -- $\Psi_{(m)}^{-1}$, --, therefor.

In column 30, line 6, in Claim 13, delete " $\gamma_{ij,m}\hat{\vec{h}}_{ij}^{(m)}$ " and insert -- $\gamma_{ij,m}\tilde{\vec{h}}_{ij}^{(m)}$ --, therefor.

Signed and Sealed this  
Second Day of September, 2014

Michelle K. Lee  
*Deputy Director of the United States Patent and Trademark Office*

CERTIFICATE OF CORRECTION (continued)
U.S. Pat. No. 8,483,398 B2

In column 30, line 8, in Claim 13, delete " $\tilde{\vec{h}}^{(m)}$ " and insert -- $\tilde{\vec{h}}_{ij}^{(m)}$ --, therefor.

In column 31, lines 47-50, in Claim 19, delete " $F\Lambda_{(m)}^{-1} = F\Lambda_{(m-1)}^{-1} - \dfrac{\left|F\Psi_{m-1}^{-1} \cdot F\tilde{h}^{(m-1)}\right|^2}{1 + \left|F\tilde{h}^{(m-1)}\right|^2 \; F\Psi_{m-1}^{-1}}$ " and insert -- $F\Lambda_{(m)}^{-1} = F\Lambda_{(m-1)}^{-1} - \dfrac{\left|F\Psi_{m-1}^{-1} \cdot F\tilde{h}^{(m-1)}\right|^2}{1 + \left|F\tilde{h}^{(m-1)}\right|^2 \cdot F\Psi_{m-1}^{-1}}$ --, therefor.

In column 32, lines 1-4, in Claim 19, delete " $F\Psi_{(m)}^{-1} = \beta_m^{-1}\left(F\Psi_{(m-1)}^{-1} - \dfrac{\left|F\Psi_{(m-1)}^{-1} \cdot F\tilde{h}^{(m-1)}\right|^2}{\left|F\tilde{h}^{(m-1)}\right|^2 \; F\Psi_{(m)}^{-1} - \beta_m}\right)$ " and insert -- $F\Psi_{(m)}^{-1} = \beta_m^{-1}\left(F\Psi_{(m-1)}^{-1} - \dfrac{\left|F\Psi_{(m-1)}^{-1} \cdot F\tilde{h}^{(m-1)}\right|^2}{\left|F\tilde{h}^{(m-1)}\right|^2 \cdot F\Psi_{(m)}^{-1} - \beta_m}\right)$ --, therefor.